(12) United States Patent
Gallagher et al.

(10) Patent No.: US 7,873,015 B2
(45) Date of Patent: Jan. 18, 2011

(54) METHOD AND SYSTEM FOR REGISTERING AN UNLICENSED MOBILE ACCESS SUBSCRIBER WITH A NETWORK CONTROLLER

(75) Inventors: Michael D. Gallagher, San Jose, CA (US); Rajeev Gupta, Sunnyvale, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 1564 days.

(21) Appl. No.: 11/097,866

(22) Filed: Mar. 31, 2005

(65) Prior Publication Data

US 2006/0099935 A1    May 11, 2006
US 2009/0149157 A9    Jun. 11, 2009

Related U.S. Application Data

(63) Continuation-in-part of application No. 11/013,883, filed on Dec. 15, 2004, now Pat. No. 7,640,008, and a continuation-in-part of application No. 10/688,470, filed on Oct. 17, 2003, now Pat. No. 7,127,250.

(60) Provisional application No. 60/564,696, filed on Apr. 22, 2004, provisional application No. 60/530,141, filed on Dec. 16, 2003, provisional application No. 60/552,455, filed on Mar. 12, 2004, provisional application No. 60/419,785, filed on Oct. 18, 2002.

(51) Int. Cl.
*H04W 4/00* (2009.01)

(52) U.S. Cl. .................. 370/338; 455/552.1; 455/426.1; 455/435.1; 455/436

(58) Field of Classification Search ...... 455/432.1–444, 455/456, 552.1, 404.2, 553.1, 450–454, 426.1; 340/825.36, 825.49; 370/338
See application file for complete search history.

(56) References Cited

U.S. PATENT DOCUMENTS

| 5,101,501 | A | 3/1992 | Gilhousen et al. |
| 5,109,528 | A | 4/1992 | Uddenfeldt |
| 5,226,045 | A | 7/1993 | Chuang |
| 5,235,632 | A | 8/1993 | Raith |
| 5,260,944 | A | 11/1993 | Tomabechi |
| 5,260,988 | A | 11/1993 | Schellineig et al. |

(Continued)

FOREIGN PATENT DOCUMENTS

EP    0936777 A1    8/1999

(Continued)

OTHER PUBLICATIONS

PCT/US2005/013807, filed Nov. 2, 2006, Kineto Wireless, Inc., International Preliminary Report on Patentability of a Related Application (dated Nov. 2, 2006).

(Continued)

*Primary Examiner*—Lester Kincaid
*Assistant Examiner*—Daniel Lai
(74) *Attorney, Agent, or Firm*—Adeli & Tollen LLP

(57) ABSTRACT

Redirection of mobile subscriber registrations using location information is described. In one embodiment, the invention includes establishing a data communications connection with a mobile station at a data communications network controller, receiving location information from the mobile station, and redirecting the mobile station to a different network controller based on the received location information.

20 Claims, 15 Drawing Sheets

U.S. PATENT DOCUMENTS

| | | |
|---|---|---|
| 5,267,261 A | 11/1993 | Blakeney, II et al. |
| 5,367,558 A | 11/1994 | Gillis et al. |
| 5,390,233 A | 2/1995 | Jensen et al. |
| 5,392,331 A | 2/1995 | Patsiokas et al. |
| 5,406,615 A | 4/1995 | Miller et al. |
| 5,428,601 A | 6/1995 | Owen |
| 5,442,680 A | 8/1995 | Schellinger et al. |
| 5,448,619 A | 9/1995 | Evans et al. |
| 5,507,035 A | 4/1996 | Bantz et al. |
| 5,533,027 A | 7/1996 | Akerberg et al. |
| 5,594,782 A | 1/1997 | Zicker et al. |
| 5,610,969 A | 3/1997 | McHenry |
| 5,634,193 A | 5/1997 | Ghisler |
| 5,640,414 A | 6/1997 | Blakeney, II et al. |
| 5,659,598 A | 8/1997 | Byrne |
| 5,659,878 A | 8/1997 | Uchida et al. |
| 5,664,005 A | 9/1997 | Emery et al. |
| 5,673,307 A | 9/1997 | Holland et al. |
| 5,675,629 A | 10/1997 | Raffel et al. |
| 5,724,658 A | 3/1998 | Hasan |
| 5,732,076 A | 3/1998 | Ketseoglou et al. |
| 5,745,852 A | 4/1998 | Khan et al. |
| 5,758,281 A | 5/1998 | Emery et al. |
| 5,796,727 A | 8/1998 | Harrison et al. |
| 5,796,729 A | 8/1998 | Greaney et al. |
| 5,815,525 A | 9/1998 | Smith |
| 5,818,820 A | 10/1998 | Anderson et al. |
| 5,822,681 A | 10/1998 | Chang et al. |
| 5,825,759 A | 10/1998 | Liu |
| 5,852,767 A | 12/1998 | Sugita |
| 5,870,677 A | 2/1999 | Takahashi et al. |
| 5,887,020 A | 3/1999 | Smith et al. |
| 5,887,260 A | 3/1999 | Nakata |
| 5,890,055 A | 3/1999 | Chu et al. |
| 5,890,064 A | 3/1999 | Widergen et al. |
| 5,903,834 A | 5/1999 | Wallstedt et al. |
| 5,915,224 A | 6/1999 | Jonsson |
| 5,926,760 A | 7/1999 | Khan et al. |
| 5,936,949 A | 8/1999 | Pasternak et al. |
| 5,940,512 A | 8/1999 | Tomoike |
| 5,946,622 A | 8/1999 | Bojeryd |
| 5,949,773 A | 9/1999 | Bhalla et al. |
| 5,960,341 A | 9/1999 | LeBlanc et al. |
| 5,995,828 A | 11/1999 | Nishida |
| 6,016,318 A | 1/2000 | Tomoike |
| 6,035,193 A | 3/2000 | Buhrmann et al. |
| 6,052,592 A | 4/2000 | Schellinger et al. |
| 6,101,176 A | 8/2000 | Honkasalo et al. |
| 6,112,080 A | 8/2000 | Anderson et al. |
| 6,112,088 A | 8/2000 | Haartsen |
| 6,119,000 A | 9/2000 | Stephenson et al. |
| 6,130,886 A | 10/2000 | Ketseoglou et al. |
| 6,134,227 A | 10/2000 | Magana |
| 6,138,019 A | 10/2000 | Trompower et al. |
| 6,226,515 B1 | 5/2001 | Pauli |
| 6,229,792 B1 * | 5/2001 | Anderson et al. ............ 370/280 |
| 6,236,852 B1 | 5/2001 | Veerasamy et al. |
| 6,243,581 B1 | 6/2001 | Jawanda |
| 6,256,511 B1 | 7/2001 | Brown |
| 6,263,211 B1 | 7/2001 | Brunner |
| 6,269,086 B1 | 7/2001 | Magana et al. |
| 6,320,873 B1 | 11/2001 | Nevo et al. |
| 6,327,470 B1 | 12/2001 | Ostling |
| 6,359,872 B1 | 3/2002 | Mahany et al. |
| 6,374,102 B1 | 4/2002 | Brachman et al. |
| 6,381,457 B1 | 4/2002 | Carlsson et al. |
| 6,389,059 B1 | 5/2002 | Smith et al. |
| 6,415,158 B1 | 7/2002 | King et al. |
| 6,430,395 B2 | 8/2002 | Arazi et al. |
| 6,434,389 B1 | 8/2002 | Meskanen et al. |
| 6,438,369 B1 * | 8/2002 | Huang et al. ............. 455/417 |
| 6,445,921 B1 | 9/2002 | Bell |
| 6,463,307 B1 | 10/2002 | Larsson et al. |
| 6,539,237 B1 | 3/2003 | Sayers et al. |
| 6,542,516 B1 | 4/2003 | Vialen et al. |
| 6,553,219 B1 | 4/2003 | Vilander et al. |
| 6,556,553 B1 | 4/2003 | Palmer et al. |
| 6,556,822 B1 | 4/2003 | Matsumoto |
| 6,556,825 B1 | 4/2003 | Mansfield |
| 6,556,830 B1 | 4/2003 | Lenzo |
| 6,574,266 B1 | 6/2003 | Haartsen |
| 6,587,444 B1 | 7/2003 | Lenzo et al. |
| 6,633,761 B1 | 10/2003 | Singhal |
| 6,643,512 B1 | 11/2003 | Ramaswamy |
| 6,647,426 B2 | 11/2003 | Mohammed |
| 6,658,250 B1 | 12/2003 | Ganesan et al. |
| 6,665,276 B1 | 12/2003 | Culbertson et al. |
| 6,675,009 B1 | 1/2004 | Cook |
| 6,680,923 B1 | 1/2004 | Leon |
| 6,711,400 B1 | 3/2004 | Aura |
| 6,766,160 B1 | 7/2004 | Lemilainen |
| 6,788,656 B1 | 9/2004 | Smolentzov et al. |
| 6,801,519 B1 | 10/2004 | Mangal |
| 6,801,772 B1 | 10/2004 | Townend et al. |
| 6,801,777 B2 | 10/2004 | Rusch |
| 6,807,417 B2 | 10/2004 | Sallinen et al. |
| 6,824,048 B1 | 11/2004 | Itabashi et al. |
| 6,826,154 B2 | 11/2004 | Subbiah et al. |
| 6,829,227 B1 | 12/2004 | Pitt |
| 6,842,462 B1 | 1/2005 | Ramjee et al. |
| 6,845,095 B2 | 1/2005 | Krishnarajah et al. |
| 6,853,851 B1 | 2/2005 | Rautiola et al. |
| 6,895,255 B1 | 5/2005 | Bridgelall |
| 6,909,705 B1 | 6/2005 | Lee et al. |
| 6,922,559 B2 | 7/2005 | Mohammed |
| 6,925,074 B1 | 8/2005 | Vikberg et al. |
| 6,937,862 B2 | 8/2005 | Back et al. |
| 6,970,719 B1 | 11/2005 | McConnell et al. |
| 7,009,952 B1 | 3/2006 | Razavilar et al. |
| 7,349,698 B2 | 3/2008 | Gallagher |
| 2001/0029186 A1 | 10/2001 | Canyon et al. |
| 2001/0031645 A1 | 10/2001 | Jarrett |
| 2001/0046860 A1 | 11/2001 | Lee |
| 2001/0049790 A1 | 12/2001 | Faccin et al. |
| 2002/0032030 A1 | 3/2002 | Berglund et al. |
| 2002/0035699 A1 | 3/2002 | Crosbie |
| 2002/0045459 A1 | 4/2002 | Morikawa |
| 2002/0058515 A1 * | 5/2002 | Holler et al. ............... 455/455 |
| 2002/0066036 A1 | 5/2002 | Makineni |
| 2002/0075844 A1 | 6/2002 | Hagen |
| 2002/0082015 A1 | 6/2002 | Wu |
| 2002/0085516 A1 | 7/2002 | Bridgelall |
| 2002/0102974 A1 | 8/2002 | Raith |
| 2002/0118674 A1 | 8/2002 | Faccin et al. |
| 2002/0132630 A1 | 9/2002 | Arazi et al. |
| 2002/0142761 A1 | 10/2002 | Wallstedt et al. |
| 2002/0147008 A1 | 10/2002 | Kallio |
| 2002/0147016 A1 | 10/2002 | Arazi et al. |
| 2002/0155829 A1 | 10/2002 | Proctor, Jr. et al. |
| 2002/0160811 A1 | 10/2002 | Jannette et al. |
| 2002/0166068 A1 | 11/2002 | Kilgore |
| 2002/0191575 A1 | 12/2002 | Kalavade et al. |
| 2002/0197984 A1 | 12/2002 | Monin et al. |
| 2003/0007475 A1 | 1/2003 | Tsuda et al. |
| 2003/0031151 A1 | 2/2003 | Sharma et al. |
| 2003/0043773 A1 | 3/2003 | Chang |
| 2003/0087653 A1 | 5/2003 | Leung |
| 2003/0112789 A1 | 6/2003 | Heinonen |
| 2003/0119480 A1 | 6/2003 | Mohammed |
| 2003/0119490 A1 | 6/2003 | Mohammed |
| 2003/0119527 A1 | 6/2003 | Labun et al. |
| 2003/0119548 A1 | 6/2003 | Mohammed |
| 2003/0130008 A1 | 7/2003 | Rajaniemi et al. |
| 2003/0136827 A1 * | 7/2003 | Kaneko et al. ............. 235/375 |

| | | | |
|---|---|---|---|
| 2003/0139180 A1 | 7/2003 | McIntosh et al. | |
| 2003/0142673 A1 | 7/2003 | Patil | |
| 2003/0176186 A1 | 9/2003 | Mohammed | |
| 2003/0193952 A1 | 10/2003 | O'Neill | |
| 2003/0210199 A1 | 11/2003 | Sward et al. | |
| 2003/0219024 A1 | 11/2003 | Purnadi et al. | |
| 2004/0008649 A1 | 1/2004 | Wybenga | |
| 2004/0009749 A1 | 1/2004 | Arazi et al. | |
| 2004/0013099 A1 | 1/2004 | O'Neill | |
| 2004/0037312 A1 | 2/2004 | Spear | |
| 2004/0053623 A1 | 3/2004 | Hoff et al. | |
| 2004/0068571 A1 | 4/2004 | Ahmavaara | |
| 2004/0077355 A1 | 4/2004 | Krenik et al. | |
| 2004/0077356 A1 | 4/2004 | Krenik et al. | |
| 2004/0077374 A1 | 4/2004 | Terry | |
| 2004/0087307 A1* | 5/2004 | Ibe et al. | 455/436 |
| 2004/0116120 A1 | 6/2004 | Gallagher et al. | |
| 2004/0147223 A1 | 7/2004 | Cho | |
| 2004/0171378 A1 | 9/2004 | Rautila | |
| 2004/0192211 A1 | 9/2004 | Gallagher et al. | |
| 2004/0202132 A1 | 10/2004 | Heinonen | |
| 2004/0203346 A1 | 10/2004 | Myhre et al. | |
| 2004/0203737 A1 | 10/2004 | Myhre et al. | |
| 2004/0203800 A1 | 10/2004 | Myhre et al. | |
| 2004/0203815 A1 | 10/2004 | Shoemake et al. | |
| 2004/0240525 A1 | 12/2004 | Karabinis et al. | |
| 2005/0064896 A1 | 3/2005 | Rautiola et al. | |
| 2005/0101245 A1 | 5/2005 | Ahmavaara | |
| 2005/0101329 A1 | 5/2005 | Gallagher | |
| 2005/0181805 A1 | 8/2005 | Gallagher | |
| 2005/0186948 A1 | 8/2005 | Gallagher | |
| 2005/0198199 A1 | 9/2005 | Dowling | |
| 2005/0207395 A1 | 9/2005 | Mohammed | |
| 2005/0255879 A1 | 11/2005 | Shi | |
| 2005/0265279 A1 | 12/2005 | Markovic | |
| 2005/0266853 A1 | 12/2005 | Gallagher | |
| 2005/0271008 A1 | 12/2005 | Gallagher | |
| 2005/0272424 A1 | 12/2005 | Gallagher | |
| 2005/0272449 A1 | 12/2005 | Gallagher | |
| 2006/0009201 A1 | 1/2006 | Gallagher | |
| 2006/0009202 A1 | 1/2006 | Gallagher | |
| 2006/0019656 A1 | 1/2006 | Gallagher | |
| 2006/0019657 A1 | 1/2006 | Gallagher | |
| 2006/0019658 A1 | 1/2006 | Gallagher | |
| 2006/0025143 A1 | 2/2006 | Gallagher | |
| 2006/0025144 A1 | 2/2006 | Gallagher | |
| 2006/0025145 A1 | 2/2006 | Gallagher | |
| 2006/0025146 A1 | 2/2006 | Gallagher | |
| 2006/0025147 A1 | 2/2006 | Gallagher | |
| 2006/0079258 A1 | 4/2006 | Gallagher | |
| 2006/0079259 A1 | 4/2006 | Gallagher | |
| 2006/0079273 A1 | 4/2006 | Gallagher | |
| 2006/0079274 A1 | 4/2006 | Gallagher | |
| 2006/0098598 A1 | 5/2006 | Gallagher | |
| 2006/0114871 A1 | 6/2006 | Buckley et al. | |
| 2008/0242298 A1* | 10/2008 | Nylander et al. | 455/435.2 |

FOREIGN PATENT DOCUMENTS

| | | |
|---|---|---|
| EP | 1207708 B1 | 10/2004 |
| EP | 05736887 | 4/2005 |
| EP | 1741238 | 1/2007 |
| GB | 2282735 A | 12/1995 |
| WO | WO 9204796 A1 | 3/1992 |
| WO | WO 9724004 A1 | 7/1997 |
| WO | WO 9948312 A1 | 9/1999 |
| WO | WO 9948315 A1 | 9/1999 |
| WO | WO 0028762 A1 | 5/2000 |
| WO | WO 0051387 A1 | 8/2000 |
| WO | WO 02/45456 A1 | 6/2002 |
| WO | WO 03/039009 | 5/2003 |
| WO | WO 03092312 A1 | 6/2003 |
| WO | WO 03039009 A3 | 8/2003 |
| WO | WO 03/107704 | 12/2003 |
| WO | WO 2004/002051 | 12/2003 |
| WO | WO 2004034219 A2 | 4/2004 |
| WO | WO 2004039111 A1 | 5/2004 |
| WO | WO 2005006597 A1 | 1/2005 |
| WO | WO 2005060292 | 6/2005 |
| WO | WO 2005107169 A1 | 10/2005 |
| WO | WO 2005107297 A1 | 10/2005 |
| WO | WO 2005/107169 | 11/2005 |
| WO | WO 2005114918 A3 | 3/2006 |

OTHER PUBLICATIONS

U.S. Appl. No. 10/116,311 (Non-Final Office Action mailed: Feb. 9, 2006), filed Apr. 2, 2002, Jahangir Mohammed.
U.S. Appl. No. 10/115,767 (Non-Final Office Action mailed: Dec. 22, 2005), filed Apr. 2, 2002, Jahangir Mohammed.
U.S. Appl. No. 10/115,835 (Non-Final Office Action mailed: Jul. 25, 2005), filed Apr. 2, 2002, Jahangir Mohammed.
U.S. Appl. No. 10/116,186 (Final Office Action mailed Feb. 1, 2006), filed Apr. 2, 2002, Jahangir Mohammed.
U.S. Appl. No. 10/251,901 (Non-Final Office Action mailed: May 5, 2005, filed Sep. 20, 2002, Michael D. Gallagher.
U.S. Appl. No. 10/688,470 (Non Final Office Action mailed: Dec. 15, 2005), filed Oct. 17, 2003, Michael D. Gallagher.
U.S. Appl. No. 11/004,439 (Non-Final Office Action mailed: Sep. 21, 2005), filed Dec. 3, 2004, Michael D. Gallagher.
*Ericsson Press Release*: "Ericsson presents the Mobile@Hometm concept," Mar. 21, 2001, http://www.ericsson.com/press/archive/2001Q1/20010321-0048.html, printed Mar. 21, 2006, pp. 1-2.
Claus Lindholt Hansen et al., "Mobile@Home—a New Use Case for Bluetooth in the Access Netowrk," *LM Ericsson Business Unit Multi-Service Networks*, ISSLS 2002, Apr. 14-18, 2002, Seoul, Korea, www.issls-council.org/proc02/papers/S6A3m.pdf, printed Dec. 8, 2003, 10 pages.
Perkins, Charles E., "Simplified Routing for Mobile Computers Using TCP/IP, Wireless LAN Implementation," *IBM T.J. Watson Research Center*, 0-8186-2625-9/92 1992 Proceeding, IEEE Conference on Sep. 17-18, 1992, pp. 7-13.
Wu, Jon C. et al., "Intelligent Handoff for Mobile Wireless Internet," *Mobile Networks and Applications*, Jun. 2001 Kluwer Academic Publishers, Manufactured in the Netherlands (2001) 67-79.
"Digital cellular telecommunications system (Phase 2+); Universal Mobile Telecommunications System (UMTS); Mobile radio interface Layer 3 specification; Core network protocols; Stage 3 (3GPP TS 24.008 version 5.6.0 Release 5); ETSI TS 124 008," ETSI Standards, European Telecommunications Standards Institute, Sophia-Antipo, FR, vol. 3-CN1, No. V560, Dec. 2002, pp. 293-317, XP014007949, ISSN: 0000-0001.
"3rd Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.
U.S. Appl. No. 10/116,023, filed Apr. 2, 2002, Mohammed, Jahangir, Non-Final Office Action of related case mailed: Apr. 13, 2006.
U.S. Appl. No. 11/004,439, filed Dec. 3, 2004, Gallagher, Michael, Non-Final Office Action of related case mailed: Apr. 21, 2006.
U.S. Appl. No. 11/225,398, filed Sep. 12, 2005, Gallagher, Michael, Non-Final Office Action of related case mailed: Apr. 5, 2006.
U.S. Appl. No. 11/225,871, filed Sep. 12, 2005, Gallagher, Michael, Non-Final Office Action of related case mailed: Mar. 30, 2006.
U.S. Appl. No. 11/225,872, filed Sep. 12, 2005, Gallagher, Michael, Non-Final Office Action of related case mailed: May, 8, 2006.
U.S. Appl. No. 11/226,610, filed Sep. 13, 2005, Gallagher, Michael, Non-Final Office Action of related case mailed: Mar. 29, 2006.
U.S. Appl. No. 11/226,617, filed Sep. 13, 2005, Gallagher, Michael, Non-Final Office Action of related case mailed: Apr. 6, 2006.
U.S. Appl. No. 11/227,573, filed Sep. 14, 2005, Gallagher, Michael, Non-Final Office Action of related case mailed: Apr. 6, 2006.
U.S. Appl. No. 11/227,784, filed Sep. 14, 2005, Gallagher, Michael, Non-Final Office Action of related case mailed: Mar. 28, 2006.

U.S. Appl. No. 11/227,840, filed Sep. 14, 2005, Gallagher, Michael, Non-Final Office Action of related case mailed: Apr. 21, 2006.
PCT/US2005/040689, filed Mar 13, 2006, Kineto Wireless, Inc.
U.S. Appl. No. 11/225,870, filed Sep. 12, 2005, Gallagher, Michael.
U.S. Appl. No. 11/227,842, filed Sep. 14, 2005, Gallagher, Michael.
U.S. Appl. No. 11/228,853, filed Sep. 15, 2005, Gallagher, Michael.
U.S. Appl. No. 11/229,470, filed Sep. 15, 2005, Gallagher, Michael.
U.S. Appl. No. 11/080,714, filed Mar. 14, 2005, Satish Agrawal et al.
U.S. Appl. No. 11/107,538, filed Apr. 14, 2005, Geoffrey Mattson et al.
U.S. Appl. No. 11/110,222, filed Apr. 20, 2005, Michael D. Gallagher et al.
PCT Search Report, PCT/US2005/013807, date Apr. 21, 2005, Applicant Kineto Wireless, Inc.
Final Office Action for U.S. Appl. No. 11/013,883, Mar. 6, 2007 (mailing date), Gallagher, Michael D. et al.
Non-Final Office Action for U.S. Appl. No. 11/013,883, Aug. 24, 2006 (mailing date), Gallagher, Michael D. et al.
First Office Action for EP 05736887.0, Sep. 13, 2007 (mailing date), Kineto Wireless, Inc.
PCT/US2005/013807, Nov. 2, 2006, Kineto Wireless, Inc.
Non Final Office Action of U.S. Appl. No. 11/129,131, Feb. 21, 2007 (mailing date), Gallagher, Michael.
International Preliminary Report on Patentability and Written Opinion for PCT/US2004/042456, Jun. 29, 2006 (mailing date), Kineto Wireless, Inc.
Second Office Action of EP 05736887.0, Dec. 23, 2008 (mailing date), Kineto Wireless, Inc.
International Preliminary Report on Patentability and Written Opinion for PCT/US2005/013807, Oct. 25, 2006 (issuance date), Kineto Wireless, Inc.
Intention to grant of EP05736887, Jan. 13, 2010 (mailing date), Kineto Wireless, Inc.
Notice of Allowance of U.S. Appl. No. 11/129,131, Oct. 9, 2007 (mailing date), Gallagher, Michael.
Non-Final Office Action of U.S. Appl. No. 11/129,131, Feb. 21, 2007 (mailing date), Gallagher, Michael.
International Search Report and Written Opinion of commonly owned for PCT/US2004/042456, Apr. 27, 2005 (mailing date), Kineto Wireless, Inc.
International Preliminary Report on Patentability and Written Opinion for PCT/US2004/042456, Jun. 29, 2006 (mailing date), Kineto Wireless Inc.
ETSI TS 100 940 V7.19.1 (Apr. 2003) Digital cellular telecommunications system (Phase 2+); Mobile radio interface layer 3 specification; (3GPP TS 04.08 version 7.19.1 Release 1998); ETSI Standards, European Telecommunications Standards Institute, Sophia-Antipolis, FR, Apr. 2003, 13 pages.
*Digital Enhanced Cordless Telecommunications (DECT); Global System for Mobile Communications (GSM); DECT/GSM Interworking Profile (IWP); Access and Mapping* (protocol/procedure description for 3,1 kHz speech service): ETSI EN 300 370 V1.3.1 European Standard (Telecommunications Series) European Telecommunications Standards Institute, Sophia Antipolis, FR, Jan. 2001, 110 pages.
*Digital Enhanced Cordless Telecommunications (DECT); Global System for Mobile Communications (GSM); DECT/GSM Integration Based on Dual-Mode Terminals*: ETSI EN 301 242 V1.2.2 European Standard (Telecommunications Series), European Telecommunications Standards Institute, Sophia Antipolis, FR, Sep. 1999, 23 pages.
*Digital Enhanced Cordless Telecommunications (DECT); DECT/UMTS Interworking Profile (IWP); Part 1: General Description and Overview*: ETSI TS 101 863-1 V1.1.2, Technical Specification, European Telecommunications Standards Institute, Sophia Antipolis, FR, Nov. 2001, 38 pages.
*Radio Equipment and Systems (RES); Digital Enhanced Cordless Telecommunications/Global System for Mobile Communications (DECT/GSM) Interworking Profile; Profile Overview*: ETSI Technical Report, ETR 341, Source: ETSI DECT, ICS: 33.020, Reference: DTR/RES-03058. European Telecommunications Standards Institute, Sophia Antipolis, FR, Dec. 1996, 27 pages.
"Unlicensed Mobile Access (UMA); User Perspective (Stage 1);" UMA User Perspective (Stage 1) R1.0.0 (Sep. 1, 2004) Technical Specification, Sep. 1, 2004, 29 pages.
"Unlicensed Mobile Access (UMA); Architecture (Stage 2);" UMA Architecture (Stage 2) R1.0.0 (Sep. 1, 2004) Technical Specification, Sep. 1, 2004, 78 pages.
"Unlicensed Mobile Access (UMA); Protocols (Stage 3);" UMA Protocols (Stage 3) R1.0.0 (Sep. 1, 2004) Technical Specification, Sep. 1, 2004, 142 pages.
"Unlicensed Mobile Access (UMA); Architecture (Stage 2);" UMA Architecture (Stage 2) R1.0.1 (Oct. 8, 2004) Technical Specification, Oct. 8, 2004, 80 pages.
"Unlicensed Mobile Access (UMA); Protocols (Stage 3);" UMA Protocols (Stage 3) R1.0.1 (Oct. 8, 2004) Technical Specification, Oct. 8, 2004, 142 pages.
"Unlicensed Mobile Access (UMA); Architecture (Stage 2);" UMA Architecture (Stage 2) R1.0.2 (Nov. 3, 2004) Technical Specification, Nov. 3, 2004, 79 pages.
"Unlicensed Mobile Access (UMA); Protocols (Stage 3);" UMA Protocols (Stage 3) R1.0.2 (Nov. 5, 2004) Technical Specificatio, Nov. 5, 2004, 142 pages.
"Unlicensed Mobile Access (UMA); Architecture (Stage 2);" UMA Architecture (Stage 2) R1.0.3 (Feb. 28, 2005) Technical Specification, Feb. 28, 2005, 85 pages.
"Unlicensed Mobile Access (UMA); Protocols (Stage 3);" UMA Protocols (Stage 3) R1.0.3 (Feb. 26, 2005) Technical Specification, Feb. 26, 2005, 156 pages.
"3$^{rd}$ Generation Partnership Project; Technical Specification Group GSM/EDGE Radio Access Network; Generic Access to the A/Gb interface; Stage 2 (Release X);" 3GPP TS 43.318 V0.3.0, Jan 2005, 64 pages.
"Proposal for Stage 2 description for Generic Access to A/Gb interface", Tdoc GP-050403, Jan. 24-28, 2005, 1 page.
"3$^{rd}$ Generation Partnership Project; Technical Specification Group GSM/EDGE Radio Access Network; Generic Access to the A/Gb interface; Stage 2 (Release 6);" 3GPP TS 43.318 V0.4.0, Jan. 2005, 66 pages.
"3$^{rd}$ Generation Partnership Project; Technical Specification Group GSM/EDGE Radio Access Network; Generic Access to the A/Gb interface; Stage 2 (Release 6);" 3GPP TS 43.318 V2.0.0, Jan. 2005, 66 pages.
"3$^{rd}$ Generation Partnership Project; Technical Specification Group GSM/EDGE Radio Access Network; Generic Access to the A/Gb interface; Stage 2 (Release 6);" 3GPP TS 43.318 V6.0.0, Jan. 2005, 68 pages.
"Proposal for Stage 3 description for Generic Access to A/Gb interface", Tdoc GP-050279, Jan. 24-28, 2005, 1 page.
"3$^{rd}$ Generation Partnership Project; Technical Specification Group GSM/EDGE Radio Access Network; Generic Access to the A/Gb interface; Mobile Generic Access Interface Layer 3 Specification (Release x);" 3GPP TS 44.318 Vx.1.0, Jan. 2005, 133 pages.

* cited by examiner

METHOD AND SYSTEM FOR REGISTERING AN UNLICENSED MOBILE ACCESS SUBSCRIBER WITH A NETWORK CONTROLLER

CROSS-REFERENCE TO RELATED APPLICATIONS

This application claims the priority of Provisional Patent Application Ser. No. 60/564,696, filed Apr. 22, 2004, and entitled "UMA Network Controller (UNC) Selection and UMA Location Services Support Mechanisms." This application is a Continuation in Part of and claims the priority of U.S. Non-provisional application Ser. No. 11/013,883, entitled "Apparatus and Method for Extending the Coverage Area of A Licensed Wireless Communication System Using an Unlicensed Wireless Communication System," filed Dec. 15, 2004, now U.S. Pat. No. 7,640,008. Application Ser. No. 11/013,883 is a Continuation in Part of and claims the priority of U.S. Non-provisional application Ser. No. 10/688,470, entitled "Apparatus and Method for Extending the Coverage Area of a Licensed Wireless Communication System Using an Unlicensed Wireless Communication System," filed Oct. 17, 2003, now U.S. Pat. No. 7,127,250. The present application is also a Continuation in Part of and claims the priority of U.S. Non-provisional application Ser. No. 10/688,470. application Ser. No. 10/688,470 claims priority of Provisional Patent Application Ser. No. 60/419,785, entitled "Method for Extending the Coverage Area of a Licensed Wireless Communication System Using an Unlicensed Wireless Communication System," filed Oct. 18, 2002. application Ser. No. 11/013,883 also claims the priority of Provisional Patent Application Ser. No. 60/530,141, entitled "Unlicensed Mobile Access (UMA) Architecture," filed Dec. 16, 2003, and claims the priority of Provisional Patent Application Ser. No. 60/552,455, entitled "Unlicensed Mobile Access Mobility Management and Emergency Services," filed Mar. 12, 2004.

This application is also related to commonly owned U.S. applications: Ser. No. 10/115,833, entitled "Unlicensed Wireless Communications Base Station to Facilitate Unlicensed and Licensed Wireless Communications with a Subscriber Device, and Method of Operation," filed Apr. 2, 2002; and application Ser. No. 10/251,901, entitled "Apparatus for Supporting the Handover of a Telecommunication Session between a Licensed Wireless System and an Unlicensed Wireless System," filed Sep. 20, 2002, the contents of each of which are hereby incorporated by reference.

FIELD OF THE INVENTION

The field of invention relates generally to telecommunications. More particularly, this invention relates to registering a mobile station accessing a core network via an unlicensed wireless system with a network controller.

BACKGROUND INFORMATION

Licensed wireless systems provide mobile wireless communications to individuals using wireless transceivers. Licensed wireless systems refer to public cellular telephone systems and/or Personal Communication Services (PCS) telephone systems. Wireless transceivers include cellular telephones, PCS telephones, wireless-enabled personal digital assistants, wireless modems, and the like.

Licensed wireless systems utilize wireless signal frequencies that are licensed from governments. Large fees are paid for access to these frequencies. Expensive base station (BS) equipment is used to support communications on licensed frequencies. Base stations are typically installed approximately a mile apart from one another (e.g., cellular towers in a cellular network). The wireless transport mechanisms and frequencies employed by typical licensed wireless systems limit both data transfer rates and range. As a result, the quality of service (voice quality and speed of data transfer) in licensed wireless systems is considerably inferior to the quality of service afforded by landline (wired) connections. Thus, the user of a licensed wireless system pays relatively high fees for relatively low quality service.

Landline (wired) connections are extensively deployed and generally perform at a lower cost with higher quality voice and higher speed data services. The problem with landline connections is that they constrain the mobility of a user. Traditionally, a physical connection to the landline was required.

In the past few years, the use of unlicensed wireless communication systems to facilitate mobile access to landline-based networks have seen rapid growth. For example, such unlicensed wireless systems may support wireless communication based on the IEEE 802.11a, b or g standards (WiFi), or the Bluetooth™ standard. The mobility range associated with such systems is typically on the order of 100 meters or less. A typical unlicensed wireless communication system includes a base station comprising a wireless access point (AP) with a physical connection (e.g., coaxial, twisted pair, or optical cable) to a landline-based network. The AP has a RF transceiver to facilitate communication with a wireless handset that is operative within a modest distance of the AP, wherein the data transport rates supported by the WiFi and Bluetooth™ standards are much higher than those supported by the aforementioned licensed wireless systems. Thus, this option provides higher quality services at a lower cost, but the services only extend a modest distance from the base station.

Currently, technology is being developed to integrate the use of licensed and unlicensed wireless systems in a seamless fashion, thus enabling a user to access, via a single handset, an unlicensed wireless system when within the range of such a system, while accessing a licensed wireless system when out of range of the unlicensed wireless system. With an unlicensed network, the handset may be able to connect to a network controller that is very far or very near to the wireless access point through which it is connecting. While there are known techniques for locating a user's mobile device (e.g., cell phone) when accessing a licensed wireless system (cellular network), the implementation model for unlicensed wireless systems prevents the location of a user from being easily ascertained. For example, a typical cellular network is managed by a single entity (or multiple entities sharing management responsibilities), enabling the location of a mobile device to be determined via built-in network infrastructure. In contrast, wireless access points are typically deployed by individual users or companies, and often only provide private access. Thus, there is no single management entity that is able to control access to and use of unlicensed wireless systems. Accordingly, there is no existing infrastructure for determining the location of users accessing unlicensed wireless networks and for directing them to an appropriate network controller.

SUMMARY OF THE INVENTION

Redirection of mobile subscriber registrations using location information is described. In one embodiment, the invention includes establishing a data communications connection with a mobile station at a data communications network controller, receiving location information from the mobile station, and redirecting the mobile station to a different network controller based on the received location information.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1B illustrates protocol layers of a mobile set in accordance with one embodiment;

FIG. 1C illustrates a method of protocol conversion in accordance with one embodiment;

FIG. 10 is a block diagram of a user terminal according to an embodiment; and.

DETAILED DESCRIPTION

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present description the unlicensed wireless system may be a short-range wireless system, which may be described as an "indoor" solution. However, it will be understood through the application that the unlicensed wireless system includes unlicensed wireless systems that cover not only a portion of a building but also local outdoor regions, such as outdoor portions of a corporate campus serviced by an unlicensed wireless system. The mobile station may, for example, be a wireless phone, smart phone, personal digital assistant, or mobile computer. The "mobile station" may also, for example, be a fixed wireless device providing a set of terminal adapter functions for connecting Integrated Services Digital Network (ISDN) or Plain Old Telephone Service (POTS) terminals to the wireless system. Application of the present invention to this type of device enables the wireless service provider to offer so-called landline replacement service to users, even for user locations not sufficiently covered by the licensed wireless system. The present description is in the context of the UMA (Unlicensed Mobile Access) standardized architecture as promulgated by the UMA consortium. However, the invention is not so limited.

Throughout the following description, acronyms commonly used in the telecommunications industry for wireless services are utilized along with acronyms specific to the present invention. A table of acronyms specific to this application is included in Appendix I.

Figure 1A:
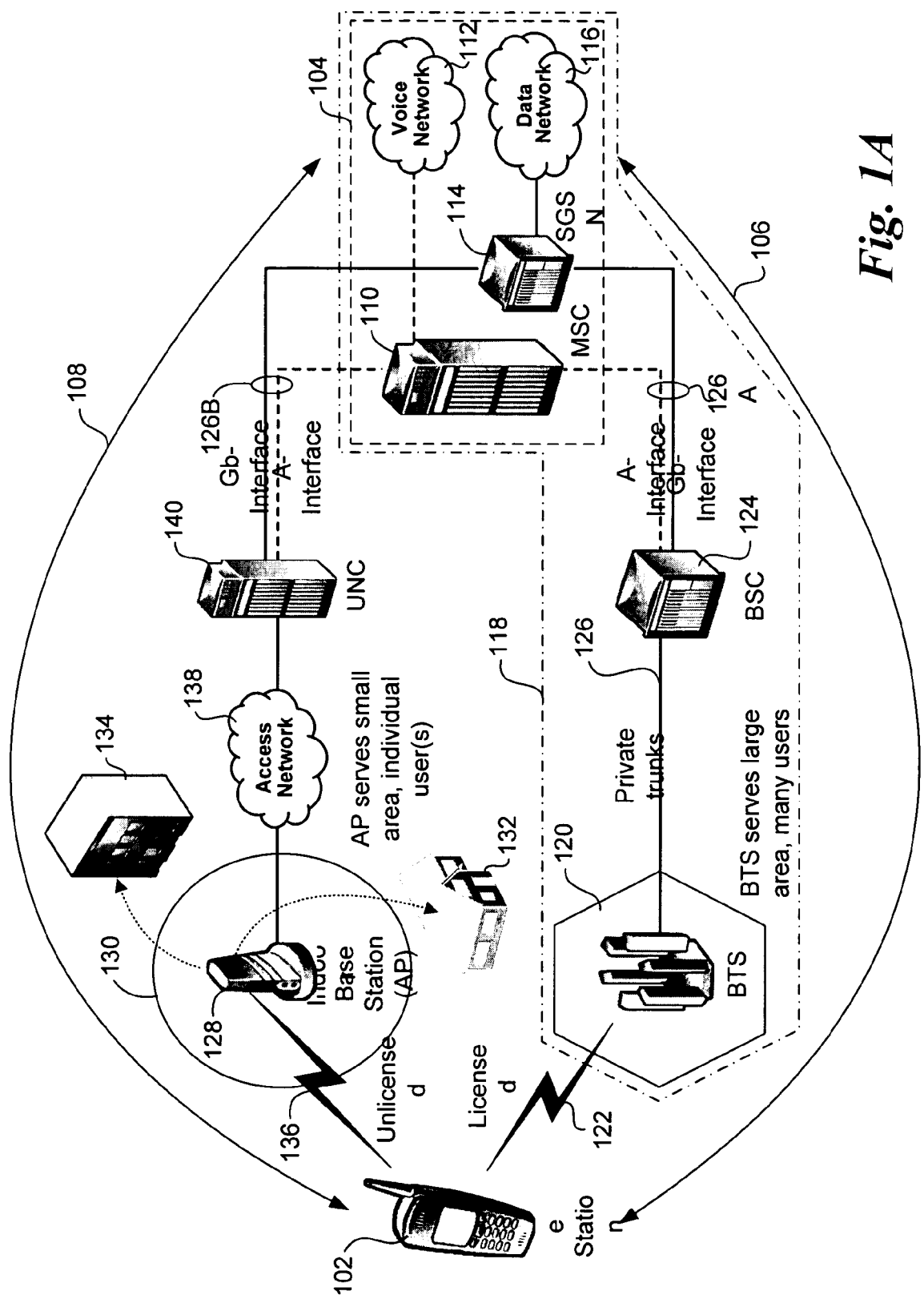
FIG. 1A provides an overview of the indoor access network (IAN) mobile service solution in accordance with one embodiment of the present invention.

FIG. 1A illustrates an Unlicensed Mobile Access (UMA) architecture 100 in accordance with one embodiment of the present invention. UMA architecture 100 enables a user of a mobile station 102 to access a voice and telecommunications network 104 via either a licensed wireless communications session 106, or an unlicensed wireless communication session 108. The telecommunications network 104 includes a mobile switching center (MSC) 110, which provides access to a voice network 112, and a Serving GPRS (General Packet Radio Service) Support Node (SGSN) 114, which provides access to a data network 116. MSC 110 also provides an internal visitor location register (VLR) function.

In further detail, the licensed wireless communication session is facilitated by infrastructure provided by a licensed wireless network 118 that includes telecommunications network 104. In the illustrated embodiment, licensed wireless network 118 depicts components common to a GSM-(Global System for Mobile Communication) based cellular network that includes multiple base transceiver stations (BTS) 120 (of which only one is shown for simplicity) that facilitate wireless communication services for various mobile stations 102 via respective licensed radio links 122 (e.g., radio links employing radio frequencies within a licensed bandwidth). Typically, the multiple BTSs 120 are configured in a cellular configuration (one per each cell) that covers a wide service area. The various BTSs 120 for a given area or region are managed by a base station controller (BSC) 124, with each BTS 120 communicatively-coupled to its BSC 124 via a private trunk 126. In general, a large licensed wireless network, such as that provided by a regional or nationwide mobile services provider, will include multiple BSCs 124.

Each BSC 124 communicates with telecommunications network 104 through a standard base station controller interface 126. For example, a BSC 124 may communicate with MSC 110 via the GSM A-interface for circuit switched voice services and with SGSN 114 via the GSM Gb interface for packet data services (GPRS). Conventional licensed voice and data networks 104 include protocols to permit seamless handoffs from one recognized BSC 124 to another BSC (not shown).

An unlicensed communication session 108 is facilitated via an (wireless) access point (AP) 128 comprising an indoor base station 130. Typically, AP 128 will be located in a fixed structure, such as a home 132 or an office building 134. The service area of indoor base station 130 includes an indoor portion of a building, although it will be understood that the service area of an indoor base station may include an outdoor portion of a building or campus. As indicated by the arrow representing unlicensed communication session 108, the mobile station 102 may be connected to the telecommunications network 114 via a second data path that includes an unlicensed wireless channel 136, access point 128, an access network 138, and an unlicensed mobile access network controller (UNC) 140. The UNC 140 communicates with telecommunications network 104 using a base station controller interface 126B that is similar to base station controller interface 126A, and includes a GSM A interface and Gb interface. Indoor base station 128 and indoor network controller 132 may include software entities stored in memory and executing on one or more microprocessors (not shown in FIG. 1A) adapted to perform protocol conversion.

Indoor base station 128 and UMA network controller 140 may also include software entities stored in memory and executing on one or more microprocessors (not shown in FIG. 1A) adapted to perform protocol conversion.

The unlicensed wireless channel 136 is facilitated by a radio link employing a wavelength (or wavelength range) in an unlicensed, free spectrum (e.g., spectrum around 2.4 GHz, 5 GHz, 11-66 GHz). An unlicensed wireless service hosting unlicensed wireless channel 136 may have an associated communication protocol. As examples, the unlicensed wireless service may be a Bluetooth™ compatible wireless service, or a wireless local area network (LAN) (WiFi) service (e.g., the IEEE 802.11a, b, or g wireless standard). This provides the user with potentially improved quality of service in the service regions of the unlicensed wireless service (i.e., within the service range of a corresponding AP). Thus, when a subscriber is within range of the unlicensed AP, the subscriber may enjoy low cost, high speed, and high quality voice and data services. In addition, the subscriber enjoys extended service range since the handset can receive services deep within a building at locations that otherwise may not be reliably serviced by a licensed wireless system. At the same time, the subscriber can roam outside the range of the unlicensed AP without dropping communications. Instead, roaming outside the range of the unlicensed AP results in a seamless handoff (also referred to as a handover) wherein communication services are automatically provided by the licensed wireless system, as described in more detail in U.S. patent application Ser. No. 10/115,833, the contents of which are hereby incorporated by reference.

Mobile station 102 may include a microprocessor and memory (not shown) that stores computer program instructions for executing wireless protocols for managing communication sessions. As illustrated in FIG. 1B, in one embodiment the mobile station 102 includes a layer 1 protocol layer 142, layer 2 protocol layer 144, and a layer 3 signaling protocol layer for the licensed wireless service that includes a radio resource (RR) sublayer 146, a mobility management (MM) sublayer 148, and a call management (CM) layer 150. It will be understood that the level 1, level 2, and level 3 layers may be implemented as software modules, which may also be described as software "entities." In accordance with a common nomenclature for licensed wireless services, layer 1 is the physical layer, i.e., the physical baseband for a wireless communication session. The physical layer is the lowest layer of the radio interface and provides functions to transfer bit streams over physical radio links. Layer 2 is the data link layer. The data link layer provides signaling between the mobile station and the base station controller. The RR sublayer is concerned with the management of an RR-session, which is the time that a mobile station is in a dedicated mode, as well as the configuration of radio channel, power controller, discontinuous transmission and reception, and handovers. The mobility management layer manages issues that arise from the mobility of the subscriber. The mobility management layer may, for example, deal with mobile station location, security functions, and authentication. The call control management layer provides controls for end-to-end call establishment. These functions for a licensed wireless system are well known by those in the art of wireless communication.

The mobile station may also include an unlicensed wireless service physical layer 152 (i.e., a physical layer for unlicensed wireless service such as Bluetooth, WiFi, or other unlicensed wireless channel (e.g., WiMAX)). The mobile station also includes an unlicensed wireless service level 2 link layer 154, and an unlicensed wireless service radio resource sublayer(s) 156. An access mode switch 160 is included for the mobile management 148 and call management layers 150 to access the unlicensed wireless service radio resource sublayer 156 and unlicensed wireless service link layer 154 when the mobile station 102 is within range of an unlicensed AP 128 and to support switching between licensed RR sublayer 146 and unlicensed wireless service RR sublayer 156.

The unlicensed radio resource sublayer 156 and unlicensed link layer 154 may include protocols specific to the unlicensed wireless service utilized in addition to protocols selected to facilitate seamless handoff between licensed and unlicensed wireless systems. Consequently, the unlicensed radio resource sublayer 156 and unlicensed link layer 154 need to be converted into a format compatible with a conventional base station controller interface protocol 126 recognized by a MSC, SGSN, or other voice or data network.

Referring to FIG. 1C, in one embodiment of the present invention, the mobile station 102, AP 128 and UNC 140 provide an interface conversion function to convert the level 1, level 2, and level 3 layers of the unlicensed service into a conventional base station subnetwork (BSS) interface 126B (e.g., an A-interface or a Gb-interface). As a result of the protocol conversion, a communication session may be established that is transparent to the voice network/data network 104, i.e., the voice/data network 104 uses its standard interface and protocols for the communication session as it would with a conventional communication session handled by a conventional base transceiver station. For example, in some embodiments the mobile station 102 and UNC 140 are configured to initiate and forward location update and service requests. As a result, protocols for a seamless handoff of services that is transparent to voice/data network 104 are facilitated. This permits, for example, a single phone number to be used for both the licensed wireless service and the unlicensed wireless service. Additionally, the present invention permits a variety of services that were traditionally offered only through licensed wireless services to be offered through an unlicensed wireless service. The user thus gets the benefit of potentially higher quality service when their mobile station is located within the area serviced by a high bandwidth unlicensed wireless service while also having access to conventional phone services.

The licensed wireless service may comprise any licensed wireless service having a defined BSS interface protocol 126 for a voice/data network 104. In one embodiment, the licensed wireless service is a GSM/GPRS radio access network, although it will be understood that embodiments of the present invention include other licensed wireless services. For this embodiment, the UNC 140 interconnects to the GSM core network via the same base station controller interfaces 126 used by a standard GSM BSS network element. For example, in a GSM application, these interfaces are the GSM A-interface for circuit switched voice services and the GSM Gb interface for packet data services (GPRS). In a UMTS (Universal Mobile Telecommunications System) application of the invention, the UNC 140 interconnects to the UMTS network using a UMTS Iu-cs interface for circuit switched voice services and the UMTS Iu-ps interface for packet data services. In a CDMA application of the invention, the UNC 140 interconnects with the CDMA network using the CDMA A1 and A2 interfaces for circuit switched voice services and the CDMA A10 and A11 interfaces for packet data services.

In a GSM/GPRS embodiment, UNC 140 appears to the GSM/GPRS core network as a GSM BSS network element and is managed and operated as such. In this architecture the principle elements of transaction control (e.g., call processing) are provided by higher network elements; namely the MSC 110 visitor location register (VLR) and the SGSN 114. Authorized mobile stations are allowed access to the GSM/GPRS core network either directly through the GSM radio access network if they are outside of the service area of an AP 128 or via the UMA network system if they are within the service area of an AP.

Since a communication session hosted by the UMA architecture 100 is transparent to a voice network 112 or data network 116, the unlicensed wireless service may support all user services that are typically offered by a wireless service provider. In the GSM case, this typically includes the following basic services: Telephony; Emergency call (e.g., E911 calling in North America); Short message, mobile-terminated point-to-point (MT/PP); Short message, mobile-originated point-to-point (MO/PP); GPRS bearer services; Handover (outdoor-to-indoor, indoor-to-outdoor, voice, data, SMS, SS). Additionally, GSM may also support, various supplementary services that are well-known in the art.

Figure 2A:
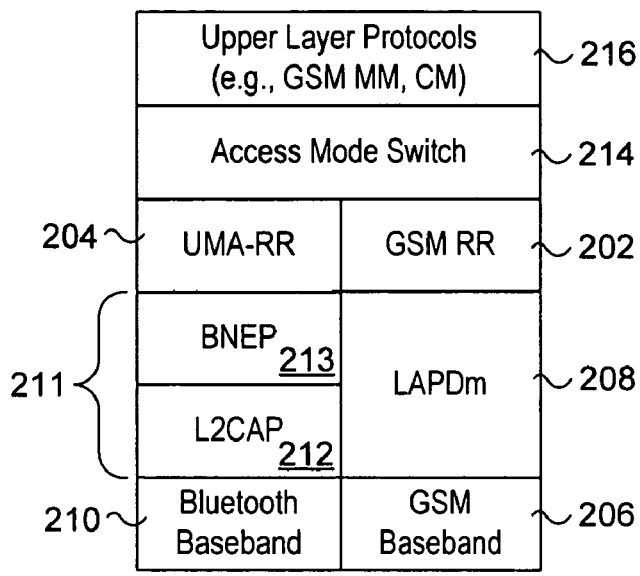
FIG. 2A illustrates an overview of a level 1, level 2, and level 3 GSM-related protocol architecture for one embodiment of a mobile station that provides unlicensed radio links via Bluetooth signaling.

FIG. 2A provides an overview of a level 1, level 2, and level 3 GSM-related protocol architecture for one embodiment of mobile station 102 that provides unlicensed radio links via Bluetooth signaling. As illustrated, there are two logical radio resource (RR) management entities: the GSM RR entity 202 and the UMA-RR entity 204. The protocol architecture includes a GSM baseband level 1 layer 206, GSM level 2 link layer (LAPDm) 208, Bluetooth baseband level 1 layer 210, Bluetooth level 2 layers 211 including a layer 2 connection access procedure (L2CAP) layer 212 and a BNEP layer 213, an access mode switch 214, and upper layer protocols 216. When the mobile station is operating in an UMA mode, the UMA-RR entity 204 is the current "serving" RR entity providing service to the mobility management (MM) sublayer via the designated service access point (RR-SAP). The GSM RR entity is detached from the MM sublayer in this mode. The UMA-RR entity 204 provides a new set of functions, and is responsible for several tasks. First the UMA-RR entity is responsible for discovery of UMA coverage and UMA registration. Second, the UMA-RR entity is responsible for emulation of the GSM RR layer to provide the expected services to the MM layer; i.e., create, maintain and tear down RR connections. All existing GSM 04.07 primitives defined for the RR-SAP apply. The plug-in of UMA-RR entity 204 is made transparent to the upper layer protocols in this way. Third, a UMA-RR entity 204 module is responsible for coordination with the GSM RR entity to manage access mode switching and handover, as described in further detail in application Ser. No. 10/688,470 referenced above.

Figure 2B:
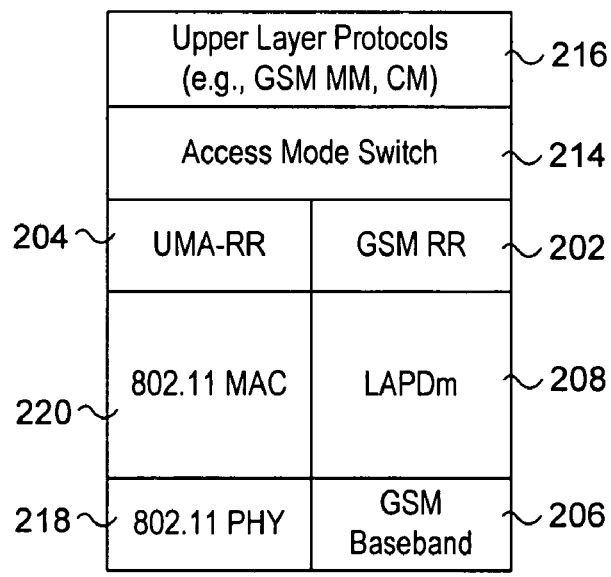
FIG. 2B illustrates an overview of a level 1, level 2, and level 3 GSM-related protocol architecture for one embodiment of a mobile station that provides unlicensed radio links via IEEE 802.11 signaling.

FIG. 2B provides an overview of a level 1, level 2, and level 3 GSM-related protocol architecture for one embodiment of mobile station 102 that provides unlicensed radio links via IEEE 802.11 signaling. All of the entities and layers are the same as described above for FIG. 2A, except that the Bluetooth layers have been replaced with an 802.11 PHY layer 218 and an 802.11 MAC layer 220.

Figure 3B:
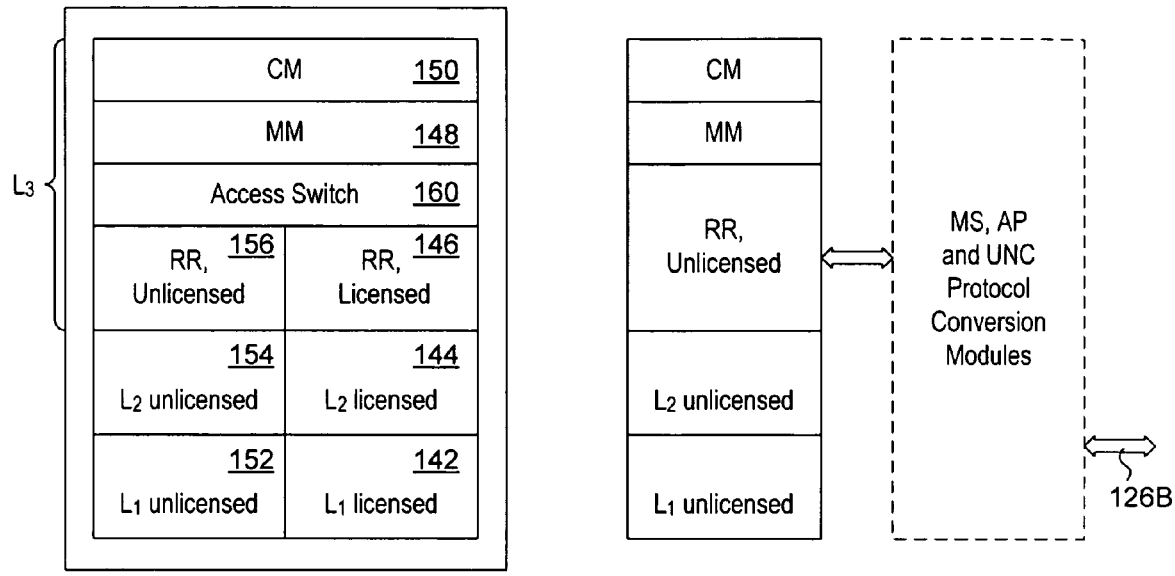
FIG. 3B shows Bluetooth lower layers employed by a mobile station and access point to facilitate physical layer communications.
Figure 3B:
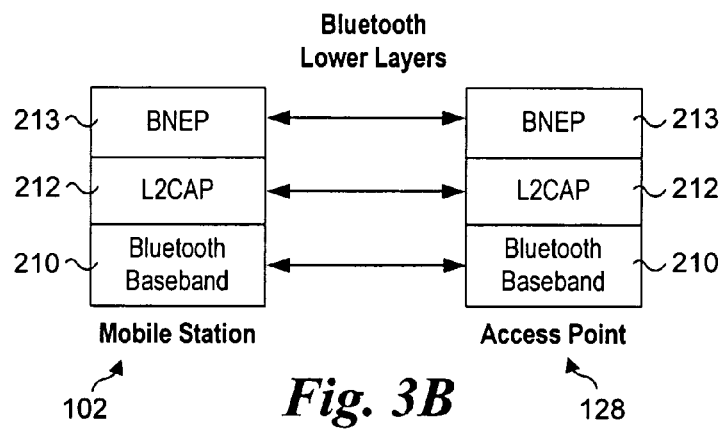
Figure 3C:
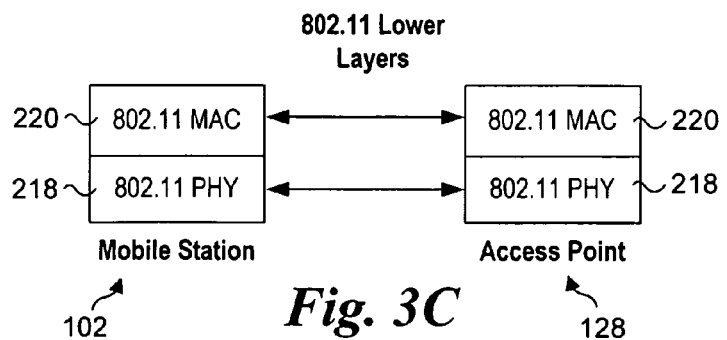
FIG. 3C shows Bluetooth lower layers employed by a mobile station and access point to facilitate physical layer communications.
Figure 3A:
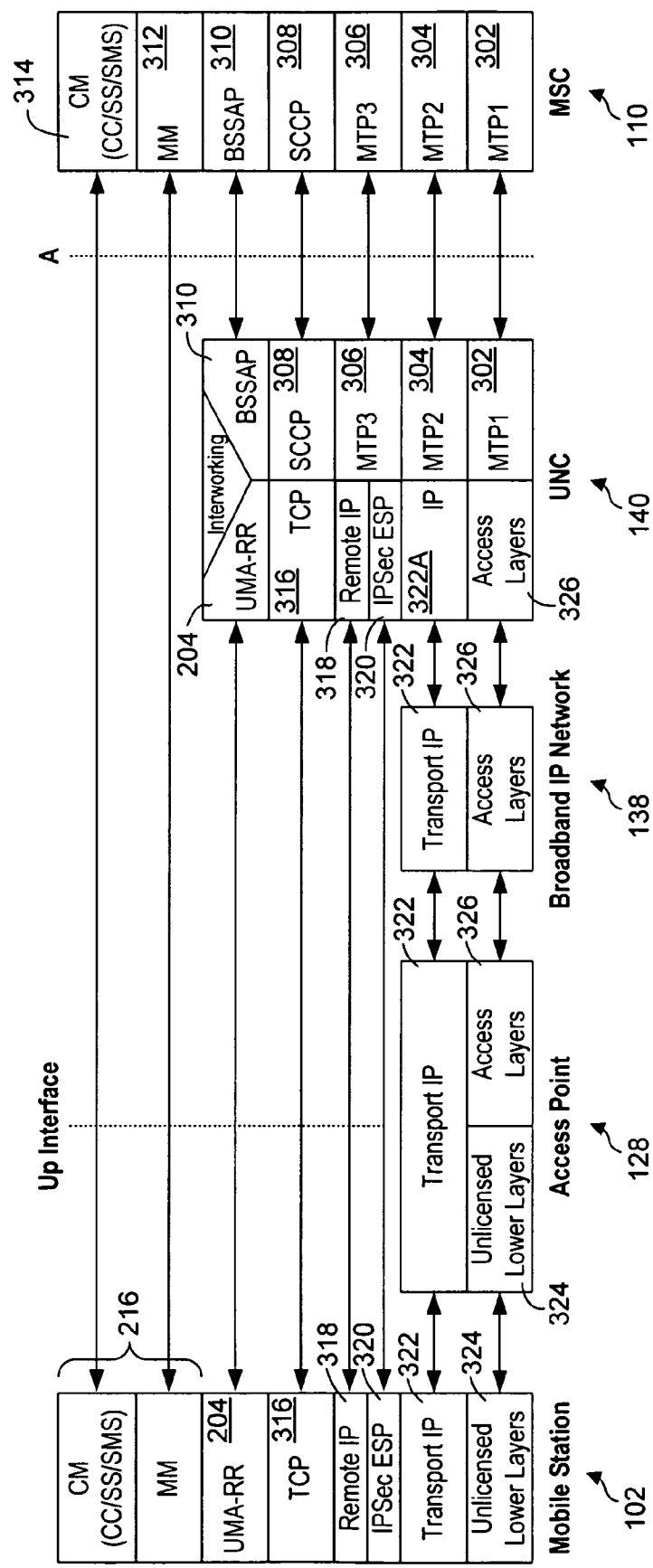
FIG. 3A illustrates the Up interface protocol architecture in support of CS Domain signaling, as well as UMA-specific signaling, according to one embodiment.

FIG. 3A illustrates the Up interface protocol architecture in support of circuit switched (CS) Domain signaling, as well as UMA-specific signaling, according to one embodiment. The MSC sublayers are conventional, well known features known in the art in regards to the message transfer part (MTP) interfaces MTP1 302, MTP2 304, and MTP3 306, signaling connection control part (SCCP) 308, base station system application part (BSSAP) 310, mobility management interface 312, and connection management interface 314.

The UMA-RR protocol supports the UMA "layer 3" signaling functions via UMA-RR layers 204 provided by each of the mobile station 102 and UNC 140. The UNC 140, acting like a BSC, terminates UMA-RR protocol messages and is responsible for the interworking between these messages and the analogous A-interface messages.

The layers below the UMA-RR layer 204 in each of mobile station 104 and UNC 140 include a TCP layer 316, a remote IP layer 318, and an IPSec (IP security) layer 320. As an option, a standard Secure Socket Layer (SSL) protocol running over TCP/IP (not shown) may be deployed in place of IPSec layer 320.

Lower-level IP connectivity between mobile station 102 and UNC 140 is supported by appropriate layers hosted by an intervening access point 128 and broadband IP network 138 (i.e., the access network 138 shown in FIG. 1A). The components for supporting the IP transport layer (i.e., the conventional network layer 3 under the seven-layer OSI model) include a transport IP layers 322 for each of the mobile station 104, AP 128, and IP network 138, and an IP layer 322A at UNC 140.

At the lowest layers (i.e., the physical and data link layers), mobile station 104 and AP 128 are depicted as providing unlicensed lower layers 324, while each of AP 128, IP network 138, and UNC 140 provide appropriate access layers 326. Typically, access layers 326 will include conventional Ethernet PHY and MAC layers (IEEE 802.3), although this is not limiting.

As shown in FIGS. 3A and 3B, the unlicensed layers lower layers 324 will depend on whether the unlicensed radio link uses Bluetooth signaling or IEEE 802.11 signaling. The Bluetooth lower layers depicted in FIG. 3A correspond to the mobile station architecture of FIG. 2A, and include a Bluetooth baseband layer 210, an L2CAP layer 212, and a BNEP layer 213. Meanwhile, the 801.11 lower layers shown in FIG. 3B correspond to the mobile station architecture of FIG. 2B, and include a 802.11 PHY layer 218 and in 802.11 MAC layer 220.

Figure 3D:
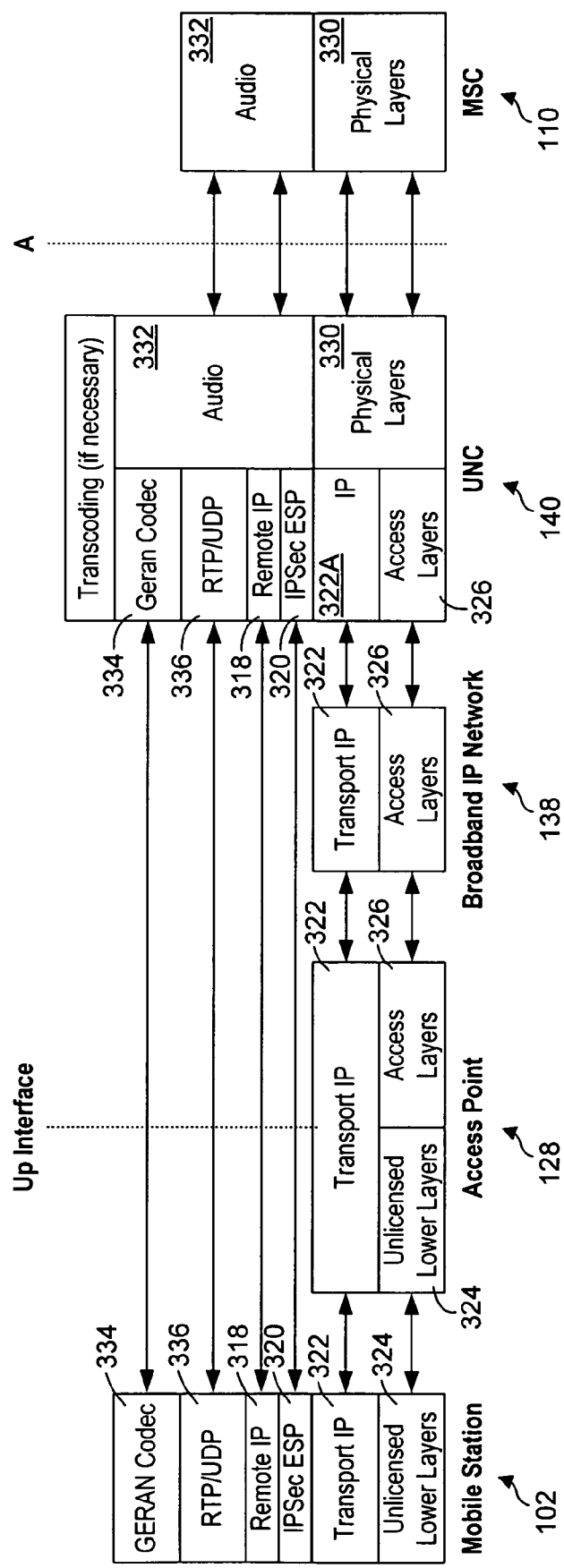
FIG. 3D illustrates the Up CS domain voice bearer protocol architecture in support of GSM voice transmission, according to one embodiment.

FIG. 3D illustrates the Up CS domain voice bearer protocol architecture in support of GSM voice transmission, according to one embodiment. In addition to the like named and referenced components common to the architectures of FIGS. 3D and 3C, facilities are provided for supporting GSM voice transmission. For the MSC 110, these components include conventional components for supporting GSM voice transmissions, and are depicted as physical layers 330 and audio 332, with similar components being deployed in UNC 140. Each of mobile station 102 and UNC 140 now include a GERAN (GSM Edge Radio Access Network) codec 334 and an RTP/UDP layer 336.

Under the architecture of FIG. 3D, audio flows over the Up interface according to the RTP framing format defined in RFC 3267 and RFC 3551. When operating in UMA mode, support for AMR FR as specified in TS 26.103 is supported. Other codecs may also be supported, such as G.711.

Figure 3E:
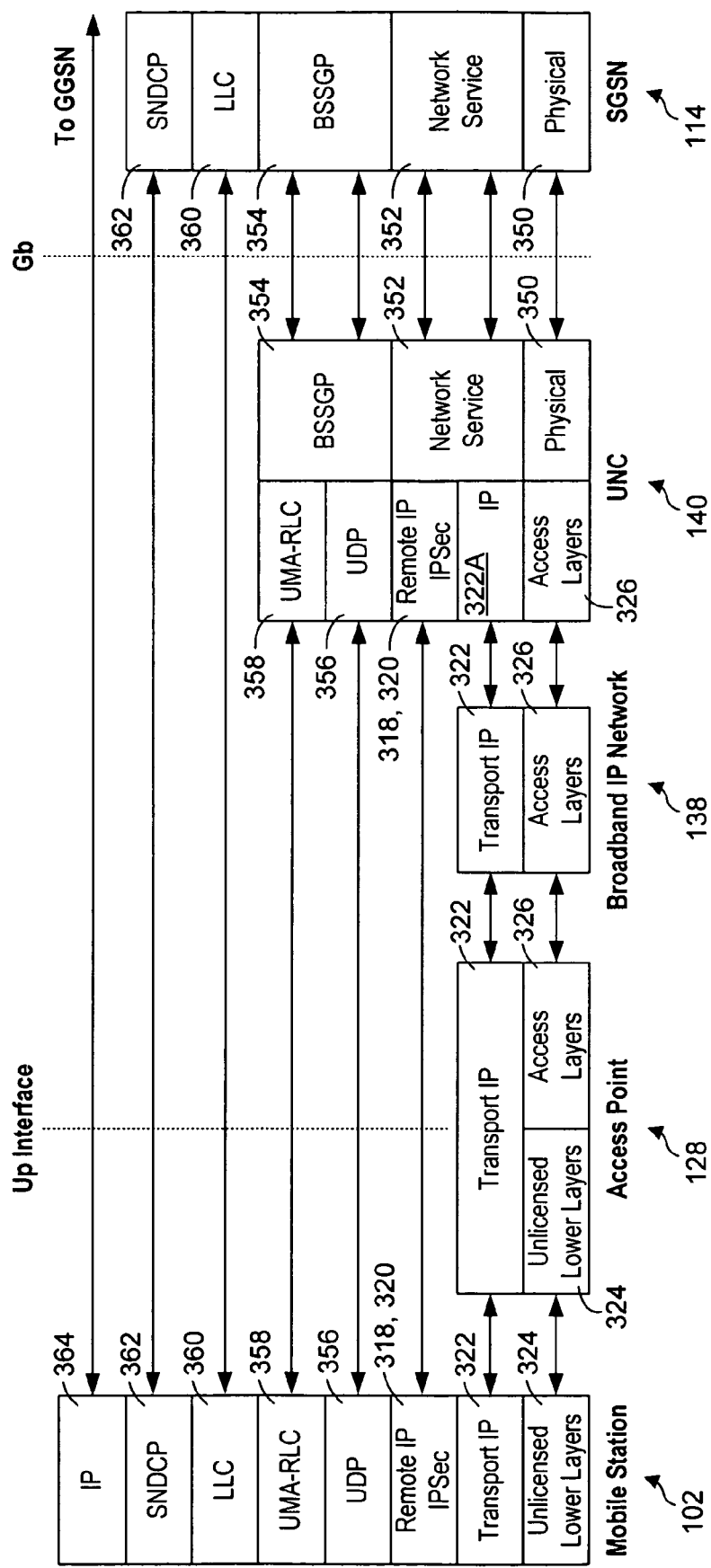
FIG. 3E illustrates the Up GPRS user plane protocol architecture, according to one embodiment.

FIG. 3E illustrates the Up GPRS user plane protocol architecture, according to one embodiment. The Up GPRS user plane protocol architecture effectively enables the tunneling of GPRS signaling and data packets through the UNC 140 utilizing the unlicensed spectrum, thus supporting a tunneling function for packet-switched traffic between the mobile station 102 and SGSN 118.

As illustrated in FIG. 3E, each of the UNC 140 and SGSN 114 employ conventional facilities for supporting GPRS signaling and data packets, including a physical layer 350, a network service layer 352, and a BSSGP layer 354. Each of mobile station 102 and UNC 140 include a UDP layer 356 and a UMA-RLC layer 358. Each of mobile station 102 and SGSN include an LLC layer 360 and an SNDCP layer 362. Mobile station 102 also includes an IP layer 364.

Under the architecture of FIG. 3E, GPRS LLC PDUs carrying data, and higher layer protocols, are carried transparently between the mobile station 102 and SGSN 114. This allows the mobile station to derive all GPRS services in the same manner as if it were in a GERAN BSS. All existing GPRS applications and MMI in mobile station 102 are unchanged. LLC PDUs are carried over UMA-RLC layer 358 from mobile station 102 to UNC 140, which relays the PDUs over to SGSN 114 using BSSGP messaging. The UMA-RLC layer 358 runs directly over the UDP layer 356 to leverage the IP bearer service.

Figure 3F:
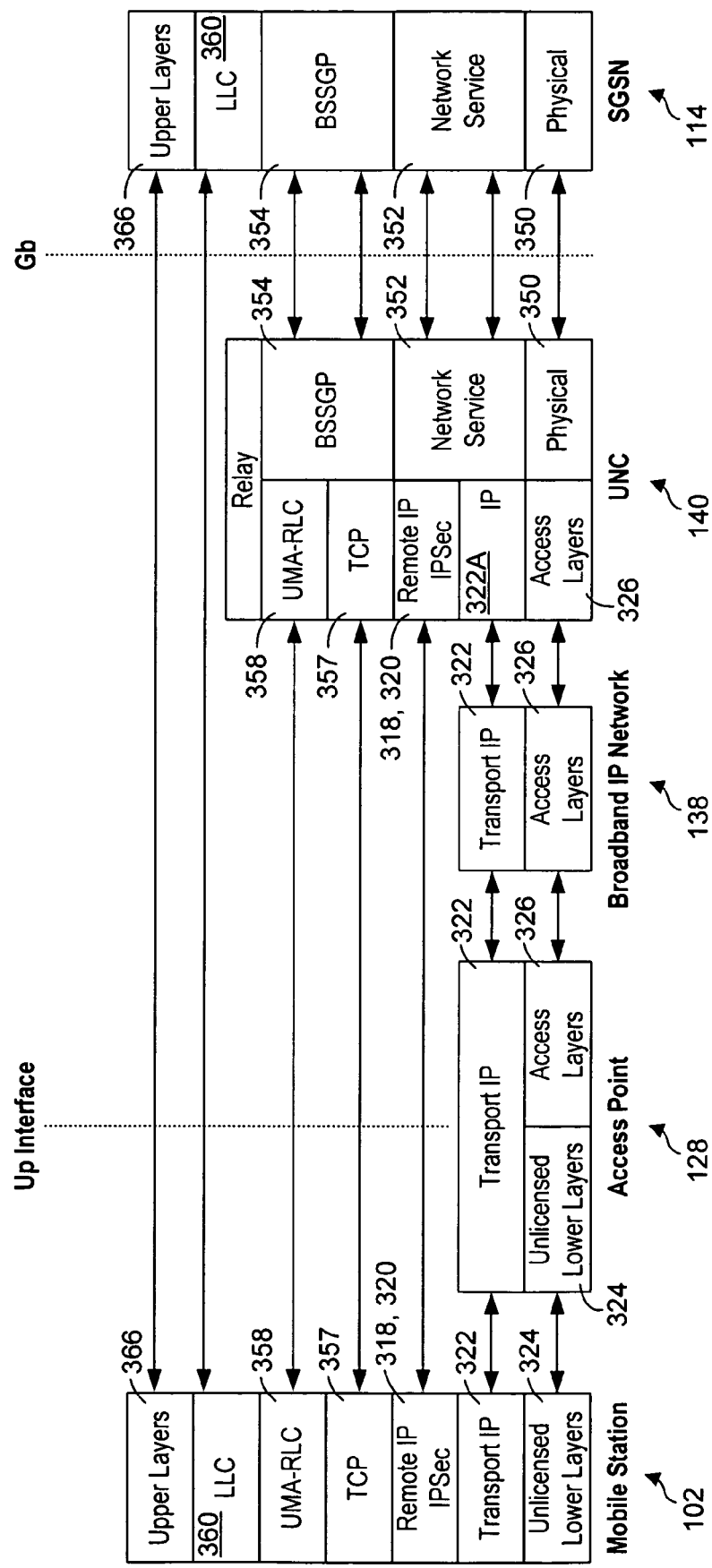
FIG. 3F illustrates the Up protocol architecture in support of GPRS Signaling, according to one embodiment.

FIG. 3F illustrates the Up protocol architecture in support of GPRS Signaling, according to one embodiment. Under this architecture, the GPRS LLC PDUs for signaling on higher layer protocols (including upper layers 366) are carried transparently between MS 102 and SGSN 114. This allows the MS to obtain all GPRS services in the same ways as if it were connected to a GERAN BSS. The GPRS-RLC protocol is replaced with an equivalent (from the upper layer perspective) UMA-RLC protocol. Reliability is ensured by TCP layer 357. As in a GERAN BSS, the UNC, acting like a BSC, terminates the UMA-RLC protocol and inter-works it to the Gb-interface using BSSGP.

As noted above, the mobile station may be, for example, a wireless phone, smart phone, personal digital assistant, or mobile computer. The mobile station may also be, for example, a fixed wireless device providing a set of terminal adapter functions for connecting Integrated Services Digital Network (ISDN) or Plain Old Telephone Service (POTS) terminals to the wireless system.

Other terminal adapter types than those listed above may be employed with embodiments of the present invention. For example: (1) a terminal adapter that supports cordless telephones rather than POTS phones; (2) a terminal adapter that supports standard Session Initiation Protocol (SIP) telephones; and (3) a terminal adapter that also integrates a corded handset and user interface, such as one would find on a desk phone. In each case, the invention described herein describes how these terminal adapter functions can be connected to the wireless system via the unlicensed network.

The use of other standard Bluetooth capabilities together with embodiments of the present invention is possible. For example, there is a Bluetooth standard capability called "SIM Access Profile" that allows one Bluetooth device (e.g., an embedded cell phone subsystem in a car) to access the SIM that is in another Bluetooth device (e.g., the user's normal cell phone), allowing the first device to take on the "personality" associated with the SIM (i.e., that of the user's normal cell phone). The embodiments described above could make use of this standard capability to give the terminal adapter-attached devices (e.g., a POTS phone) the personality of the user's cell phone.

Mobility Management

The UNC 140 provides functions equivalent to that of a GSM BSC, and as such controls one or more (virtual) UMA cells. In one embodiment, there may be a single UMA cell per UNC and, in an alternative embodiment, there may be one UMA cell per access point connected to a UNC. The latter embodiment may be less desirable due to the large number of APs expected to be used, so the UMA architecture permits flexible groupings of APs into UMA cells. Each UMA cell may be identified by a cell global identifier (CGI), with an unused absolute radio frequency channel number (ARFCN) assigned to each UMA cell. Each UMA cell may be mapped to a physical boundary by associating it with specific GSM location areas served by the MSC. GSM cells within the location areas mapped to a UMA cell are configured with ARFCN-to-CGI mappings for that UMA cell. Further, this ARFCN may be advertised in the BA list by the GSM cells to permit handovers. Note that UMA cells may use the same location area identifiers (LAI) as existing GSM cells, or a new LAI may be used for UMA cells. The latter is useful in reducing paging in GSM cells when a mobile station is known to be registered via an INC. The above discussion applies equally to GPRS routing areas and routing area identifiers (RAIs).

UMA CPE Addressing

Customer premise equipment (CPE) may include the mobile station and the access point (AP) through which the mobile station may access the UNC for UMA service. UMA CPE addressing parameters may include the parameters described below.

The UMA CPE addressing includes the international mobile subscriber identity (IMSI) associated with the SIM in the mobile equipment as a parameter. The IMSI is provided by the UMA mobile station to the UNC when it requests UMA service via the Up interface to the UNC. Unlike the GSM BSC, the UNC manages a context for each mobile station that is operating in UMA mode. Therefore, the UNC maintains a record for each served mobile station. For example, IMSI may be used by the UNC to find the appropriate mobile station record when the UNC receives a BSS-MAP paging message.

The UMA CPE addressing includes the address associated with the unlicensed interface in the mobile equipment (e.g., 802.11 MAC address) as a parameter. This identifier may be provided by the UMA mobile station to the UNC when it requests UMA service via the Up interface. The UNC may use this address as an alternative to the IMSI to limit the transfer of the IMSI over the Up interface and to assist in the routing of messages.

The UMA CPE addressing also includes the temporary logical link identifier (TLLI) assigned to the mobile station by the serving GPRS support node (SGSN) as a parameter. This identifier may be provided via standard Gb-interface procedures. The UNC may track this address for each served mobile station to support GSM Gb-interface procedures (e.g., so that downlink GPRS packets may be routed to the correct mobile station).

The UMA CPE addressing also includes the access point ID (AP-ID) as a parameter. The AP-ID may be the MAC address of the unlicensed mode access point through which the mobile station is accessing UMA service. This identifier may be provided by the UMA mobile station to the UNC when it requests UMA service via the Up interface. The AP-ID may be used by the UNC to support location services (e.g., enhanced 911 service) to the user based on the AP from which the service is being accessed. The AP-ID may also be used by the service provider to restrict UMA service access only to authorized APs.

Other CPE addressing parameters that may be used depend on the security requirements of the Up interface (e.g., the need to manage UMA mobile station IP addresses for message routing via tunneled IPSec connections, or the need to manage local credentials assigned to the mobile station by the UNC).

UMA Cell Identification

In order to facilitate the mobility management functions in GSM/GPRS, the coverage area may be split into logical registration areas called location areas (for GSM) and routing areas (for GPRS). Mobile stations may be required to register with the network each time the serving location area (or routing area) changes. One or more location areas identifiers (LAIs) may be associated with each visited location register (VLR) in a carrier's network. Likewise, one or more routing area identifiers (RAIs) may be controlled by a single SGSN.

In one embodiment, a GSM cell is identified within the location or routing area by adding a cell identity (CI) to the location or routing area identification. The cell global identification (CGI) is the concatenation of the location area identification and the cell identity. In one embodiment, the cell identity is unique within a location area.

An Example UMA Approach to Cell Identification

One example of a UMA cell identification approach is described below. In this embodiment, a single UNC provides service for one or more UMA location areas and one or more UMA routing areas, and each UMA location area (or routing area) is distinct from, or the same as, the location area (or routing area) of the overlapping GSM cell. A UMA cell is identified within the UMA location or routing area by adding a cell identity (CI) to the location or routing area identification. The UMA cell global identification (UMA-CGI) is the concatenation of the location area identification and the cell identity. In one embodiment, a UMA cell may be a pre-defined partition of the overall UMA coverage area identified by a UMA-CGI value. Note that cell identification, like UMA information, may be transparent to the AP, such that the AP is not aware of its associated UMA-CGI value. The UMA components (e.g., mobile station and UNC) may support the ability to partition the overall UMA coverage area.

A partitioning method may include implementing a one-to-one or a many-to-one correspondence between GSM cell identity and UMA cell identity. Given the identification of a preferred GSM cell in a particular area, it may be possible to determine the corresponding UMA cell identity based, for example, on UNC provisioning. An example of a one-to-one relationship is mapping a GSM cell to a UMA cell. An example of a many-to-one relationship is mapping a GSM location area (and associated GSM cells) to a UMA cell.

When a UMA mobile station connects to the UNC for UMA service, it sends the CGI value and (optionally) a path loss criterion parameter (C1) of the current GSM camping cell, as well as the neighbor cells, to the UNC. The UNC maps the GSM camping cell's CGI value to a corresponding UMA cell's CGI value based on mapping logic provisioned in the UNC. This may be a one-to-one mapping (e.g., if there is one UMA cell per GSM cell) or a many-to-one mapping (e.g., if there is one UMA cell per GSM location area). If no GSM coverage is available in the UMA service area, the UNC may assign the mobile station to a default "no GSM coverage" UMA cell. A single UNC may serve one MSC. This does not preclude UNC embodiments that combine multiple UNC "instances," as defined above, in a single device (for example, a UNC that servers multiple MSCs). Each UNC may also be assigned a unique "UMA-Handover-CGI" value used for GSM-to-UMA handover purposes. For example, this may be the value provisioned in the GSM RAN BSC's ARFCN-to-CGI tables and in the MSCs (e.g., to point to the UNC).

UMA Operating Configurations

In one embodiment, at least three UMA operating configurations may be identified. In a common core configuration, the UMA LAI and an umbrella GSM RAN LAI (e.g., that serves the subscriber's neighborhood) may be different, and the network may be engineered such that the same core network entities (e.g., MSC and SGSN) serve both the UMA cells and the umbrella GSM cells. One advantage of this configuration is that subscriber movement between the UMA coverage area and the GSM coverage area does not result in inter-system (e.g., MAP) signaling (e.g., location updates and handovers are intra-MSC).

In a separate core configuration, the UMA LAI and umbrella GSM RAN LAI are different, and the network may be engineered such that different core network entities serve the UMA cells and the umbrella GSM cells. One advantage of this configuration is that engineering of the UMA and GSM networks can be more independent than in the Common Core Configuration.

In a common LAI configuration, the UMA LAI and GSM RAN LAI are the same (e.g., different cells within the same LAI). Advantages of this configuration are that subscriber movement (while idle) between the UMA coverage area and the GSM coverage area may not result in any location update signaling, and that the mobile station can easily switch to GSM mode if UMA mode resources are temporarily unavailable (e.g., to respond to paging). Further details of this and the foregoing separate core configuration are discussed in application Ser. No. 10/688,470.

UMA Registration and Deregistration

In one embodiment, as described above, a UMA registration process does not employ signaling to the PLMN infrastructure and is contained within the UMA system (i.e., between the mobile station and UNC). The UMA registration process may serve at least two purposes. It may inform the UNC that a mobile station is connected through a particular AP and is available at a particular IP address. The UNC may keep track of this information, for example, for mobile-terminated calling. The registration process may also provide the mobile station with the operating parameters associated with the UMA service on the AP. This may be analogous to the use of the GSM broadcast control channel (BCCH) to transmit system parameters to mobile stations in GSM cells. GSM system information message content that is applicable in UMA mode may be delivered to the mobile station during the UMA registration process.

Similarly, a UMA deregistration process may allow the mobile station to explicitly inform the UNC that it is leaving UMA mode, allowing the UNC to free resources that it may have assigned to the mobile station. The UNC may also support implicit UMA deregistration, wherein a secure channel to the mobile station is abruptly terminated.

UMA Redirection

In one embodiment, as described above, when a UMA mobile station connects to the UNC for UMA service, it may send a CGI value and a path loss criterion parameter (C1) of the current GSM camping cell, as well as the neighbor cells, to the UNC. Using this information, as well as internal database information, the UNC may be able to determine if it is the correct serving UNC for the mobile station, and if it is not the correct serving UNC, to redirect the mobile station to the correct UNC. The correct serving UNC may be the UNC whose UMA service area overlaps the mobile station's umbrella GSM coverage. In one embodiment, the correct serving UNC might be attached to the same MSC as the GSM BSC to which the umbrella GSM cell belongs. In an alternative embodiment, the correct serving UNC might be attached to a different MSC that may hand-over to the MSC that provides umbrella GSM coverage to the mobile station, allowing the UNC to handover calls to and from GSM. It may also enable certain location-based services (e.g., E911 Phase 1) that can be tied to the location of the GSM cell. An internal database used by the UNC may map GSM location areas to serving UNCs and conserve the amount of data that needs to be managed. This database may only need to change when a new UNC or a new GSM location area is added.

If no GSM coverage is available when a mobile station connects to the UNC for UMA service, then, under some instances, the UNC may not reliably determine the location of the mobile station for the purposes of assigning the mobile station to the correct serving UNC (e.g., to enable handover and location-based services). The UNC may permit the operator to determine the service policy in this case (e.g., the operator may provide service to the user with certain limitations, possibly with a user interface indication on the mobile station). Additional details on UMA registration and redirection procedures are provided below.

UMA Mobile Station Idle Mode Behavior

Figure 4:
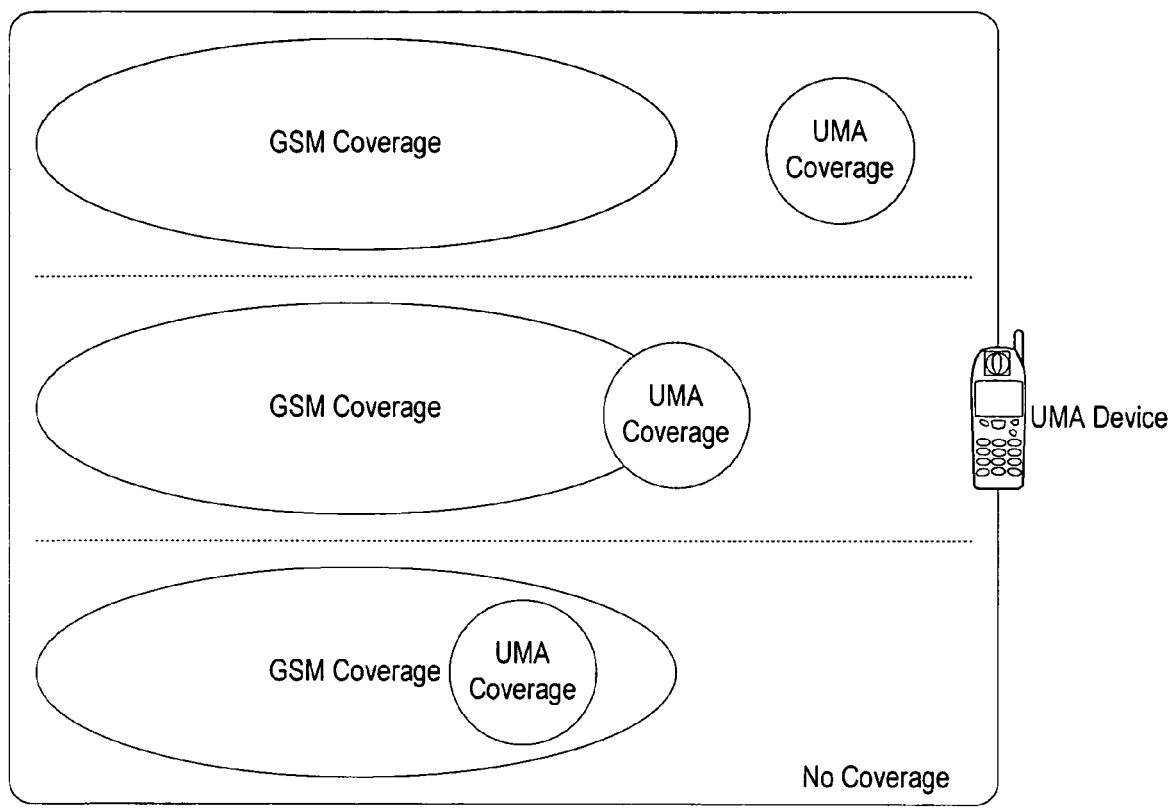
FIG. 4 illustrates several possible GSM and UMA coverage scenarios in accordance with one embodiment.

As described above, a UMA device may encounter different radio environments as illustrated in FIG. 4. In a first environment, the GSM and UMA coverage areas are completely separate and non-overlapping. In a second environment, the GSM and UMA coverage is partially overlapping. In a third environment, which may be the most common, the UMA coverage is encapsulated within the GSM coverage. A UMA device may power on in any of these environments and further may transition in a number of attached states.

At power on, and when the mobile station is idle and there is no coverage of any type, the mobile station may scan for both GSM and UMA radio coverage. If GSM coverage is detected, then the normal GSM mobility management procedure may be initiated. This condition may apply when no UMA coverage has been detected by the mobile station when GSM coverage is detected, or prior to the completion of the UMA registration process. If UMA coverage is detected, then the UMA mobile station establishes an unlicensed wireless link (e.g., WLAN link) to the AP and monitors signal quality. When the received signal level at the mobile station passes a predefined threshold, the mobile station performs the UMA registration procedure. Based upon the information returned, the mobile station may determine if a full network registration is required, and if so, what type (e.g., GSM or combined GSM/GPRS). This procedure may apply when no GSM coverage exists or when UMA coverage is detected prior to detecting GSM coverage.

When the mobile station is idle in GSM coverage, and there is no UMA coverage, the mobile station may periodically scan for UMA coverage. If UMA coverage is detected, the mobile station may initiate the UMA registration procedure described above.

When the mobile station is idle in UMA coverage and there is no GSM coverage, the mobile station may continue to perform normal GSM PLMN search procedures. If GSM coverage is detected, the mobile station may send the GSM cell information to the UNC for possible UMA redirection purposes as described above. Alternatively, the mobile station may disable normal GSM PLMN search procedures to conserve power.

When the mobile station is idle in UMA coverage, and there is GSM coverage, the mobile station may continue to perform normal GSM cell reselection procedures and may store the identification of the selected GSM cell to speed the transition to GSM mode, if required. Alternatively, the mobile station may disable normal GSM cell reselection procedures to conserve power.

At power off in UMA coverage, a detach indication may be sent by the mobile station to the PLMN via the UMAN (e.g., if required by the PLMN network or normally sent by the mobile station at power off). This indication may be encoded per the current GSM mode of operation (e.g., GSM or GPRS).

The UMA environment may be an IEEE 802.11 environment. In this case, the mobile station periodically performs an active scan for available 802.11 APs. When an AP is discovered, it may be matched against a stored profile of user preferences and security credentials, in which case the mobile station may automatically associate with the AP. The mobile station may enter low-power sleep mode, waking up periodically to measure signal quality for determining when to trigger UMA registration.

The UMA environment may be a Bluetooth environment. In this case, the mobile station previously paired with the Bluetooth AP through which it will access UMA service. Periodically, the mobile station may enter a page scan receive mode, and respond to an AP transmit page to establish a link-level connection. Once a link-level control channel is established, and if the mobile station is not otherwise active, it may enter a low-power Bluetooth state (e.g., park mode) to conserve power. Periodically, the AP may poll the mobile station to allow it to re-enter active-power mode. This periodic traffic may also be used by the mobile station to measure signal quality to determine when to perform the UMA registration procedure.

UMA Mobile Station Dedicated Mode Behavior

A UMA device engaged in a voice call, a data transaction or a simultaneous voice/data transaction may encounter a transition from GSM coverage to UMA coverage or a transition from UMA coverage to GSM coverage. In one embodiment, when the coverage transitions from GSM to UMA coverage, calls may be handed over transparently between the GSM RAN and the UMAN. In the case of voice, the handover may be accomplished by a handover function. In the case of data, session management controls may provide a common end-user experience to that provided in GPRS. Normal registration actions may occur upon a return to the idle state, if appropriate. When the coverage transitions from UMA to GSM coverage, calls may be handed over transparently between the UMAN and the GSM RAN. In the case of voice, the handover may be accomplished by a handover function. In the case of data, session management controls may provide a common end-user experience to that provided in GPRS.

Summary of Key Mobility Management Concepts

Figure 5:
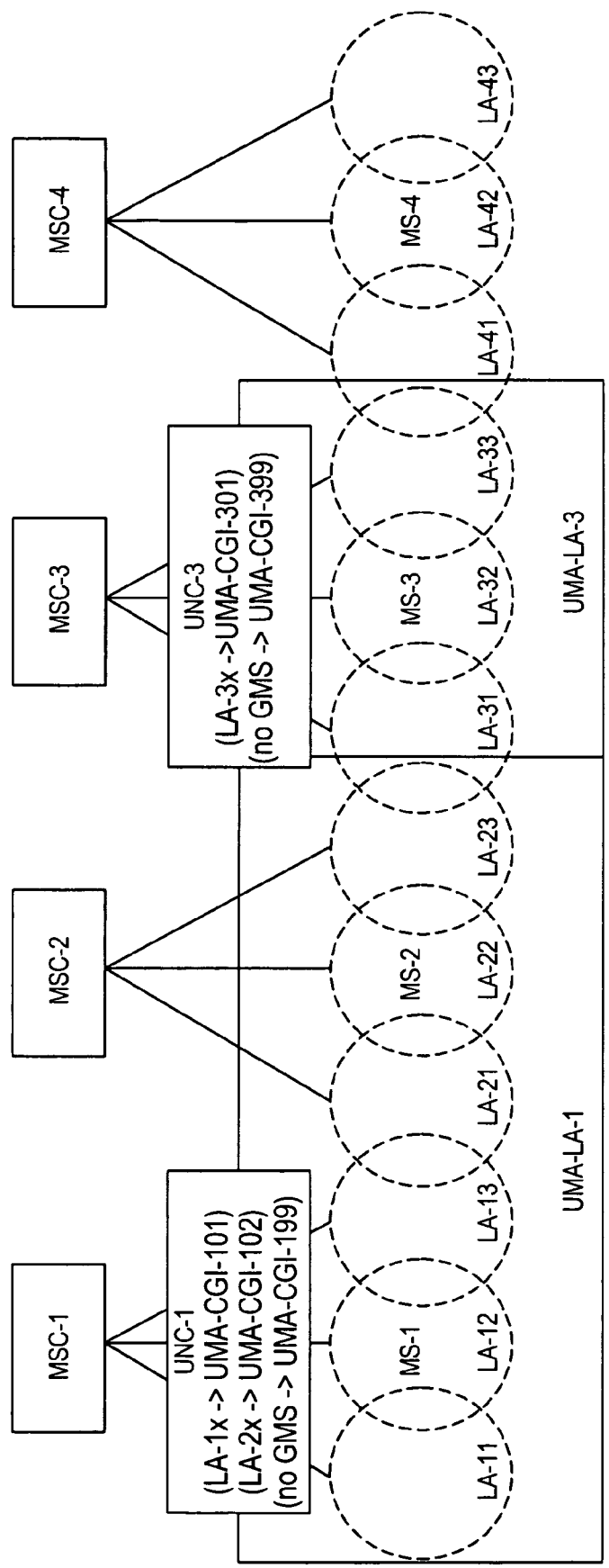
FIG. 5 illustrates exemplary mobility management functions in one embodiment.

FIG. 5 illustrates mobility management functions in one example embodiment. In FIG. 5, unlicensed network controller UNC-1 is the serving UNC for the UMA cells associated with GSM location areas LA-11 to LA-23. UNC-1 maps GSM location areas LA-1x to UMA cell UMA CGI-101 and GSM location areas LA-2x to UMA CGI-102. Unlicensed network controller UNC-3 is the serving UNC for the UMA cells associated with GSM location areas LA-31 to LA-33. UNC-3 maps GSM location areas LA-3x to UMA cell UMA CGI-301. Mobile station MS-1 will be in UMA cell UMA-CGI-101 (since GSM LA-1x is mapped to UMA-CGI-101). Mobile station MS-2 will be in UMA cell UMA-CGI-102 (since GSM LA-2x mapped to UMA-CGI-102). Mobile station MS-3 will be in UMA cell UMA-CGI-301 (since GSM LA-3x mapped to UMA-CGI-301). If mobile station MS-4 connects to UNC-1, it will be in UMA cell UMA-CGI-199 (no GSM coverage). If MS-4 connects to UNC-3, it will be in UMA cell UMA-CGI-399 (no GSM coverage). Mobile stations MS-1 and MS-2 may connect to UNC-1 without redirection. If mobile station MS-3 attempts to connect to UNC-1, it may be redirected to UNC-3.

Location Services for Emergencies and Other Purposes

Figure 7:
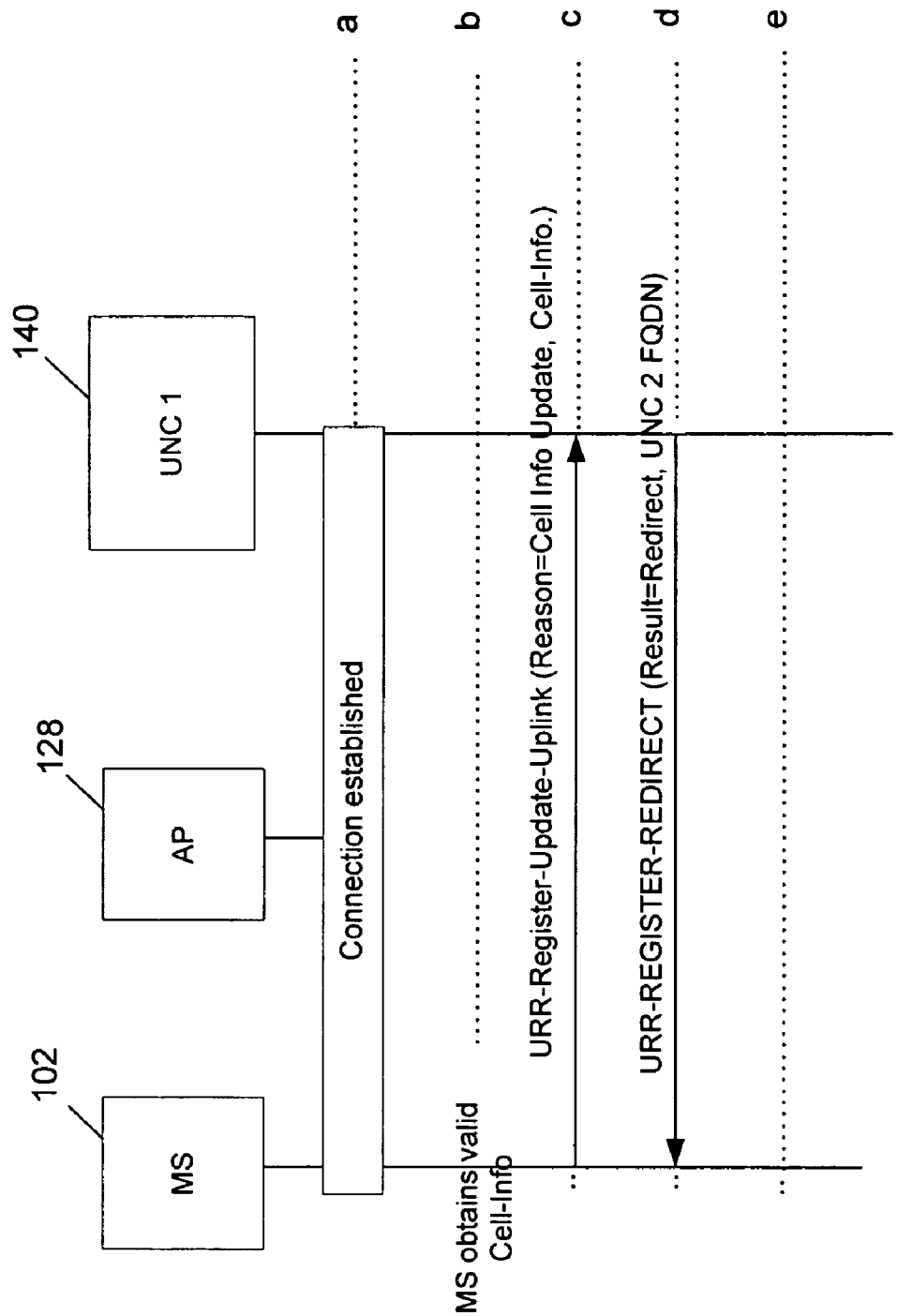
FIG. 7 is a message and data flow diagram illustrating messages and operations employed to redirect a mobile station to a different network controller after registration according to an embodiment.

The following is a method that may be used to select a UNC to handle a call from or to a MS. At a given block 911, a UNC receives location information from a MS. The location information may take any of several different forms. In one embodiment, the location information contains an identification of nearby cellular base stations. For the example of the upper MS 102 of FIG. 7, the location information may include identifications, such as BSIDs (Base Station Identification) or BSCCs (Base Station Color Code) of the three upper BTSs 120. In the example of FIG. 7, these are the base stations that are within range of the MS. The location information may also include an RxLEV (Received Level) or RSSI (Received Signal Strength Indicator) in association with each received cellular base station identification.

In GSM, the "BSID" takes the form of the Cell Global Identification (CGI). This may have a form in which the BSS and cell within the BSS is identified within a location or routing area by adding a CI to the location or routing area identification. The CI is of fixed length with 2 octets and it can be coded using a full hexadecimal representation. The CGI is the concatenation of the LAI and the CI. The LAI has three elements, a mobile country code, a mobile network code identifying the GSM PLMN in that country, and a location area code identifying a location area within a GSM PLMN.

Alternatively, the location information may not relate to any nearby base stations but instead to the connected AP. An MS may not be within range of any base stations and so may not have any valid base station information to send. The location information may then take the form of an identification of the connected AP, the street address of the AP or the or latitude and longitude coordinates of the AP. These may be obtained, for example, via GEOPRIV extensions to DHCP.

At a given block 915, the UNC then selects a network controller based on this comparison. The selection may be made by applying a CGI to a mapping table or in a variety of other ways. These ways may include reading the address for the appropriate AP from one of the lists mentioned above or by selecting a best base station for the mobile station, identifying a mobile switching center that is coupled to the selected base station, and selecting a switching network controller that is coupled to the identified mobile switching center. If the location relates to a wireless AP, then after the location of the AP is determined, the selection may be made by identifying a mobile switching center that serves locations near the determined location of the connected wireless access point, and selecting a network controller that is coupled to the identified mobile switching center. The selection may be made in a variety of other ways as appropriate for a particular application.

At a given block 917, the UNC sends an address for the selected network controller to the MS. This allows the MS to record the address and to establish a connection with that UNC. The UNC that is selected may be the same one that selected the UNC or the UNC that makes the selection may redirect the MS to a different UNC. In one embodiment, the UNC further transfers the existing call or registration to the UNC that it has selected.

Figure 6:
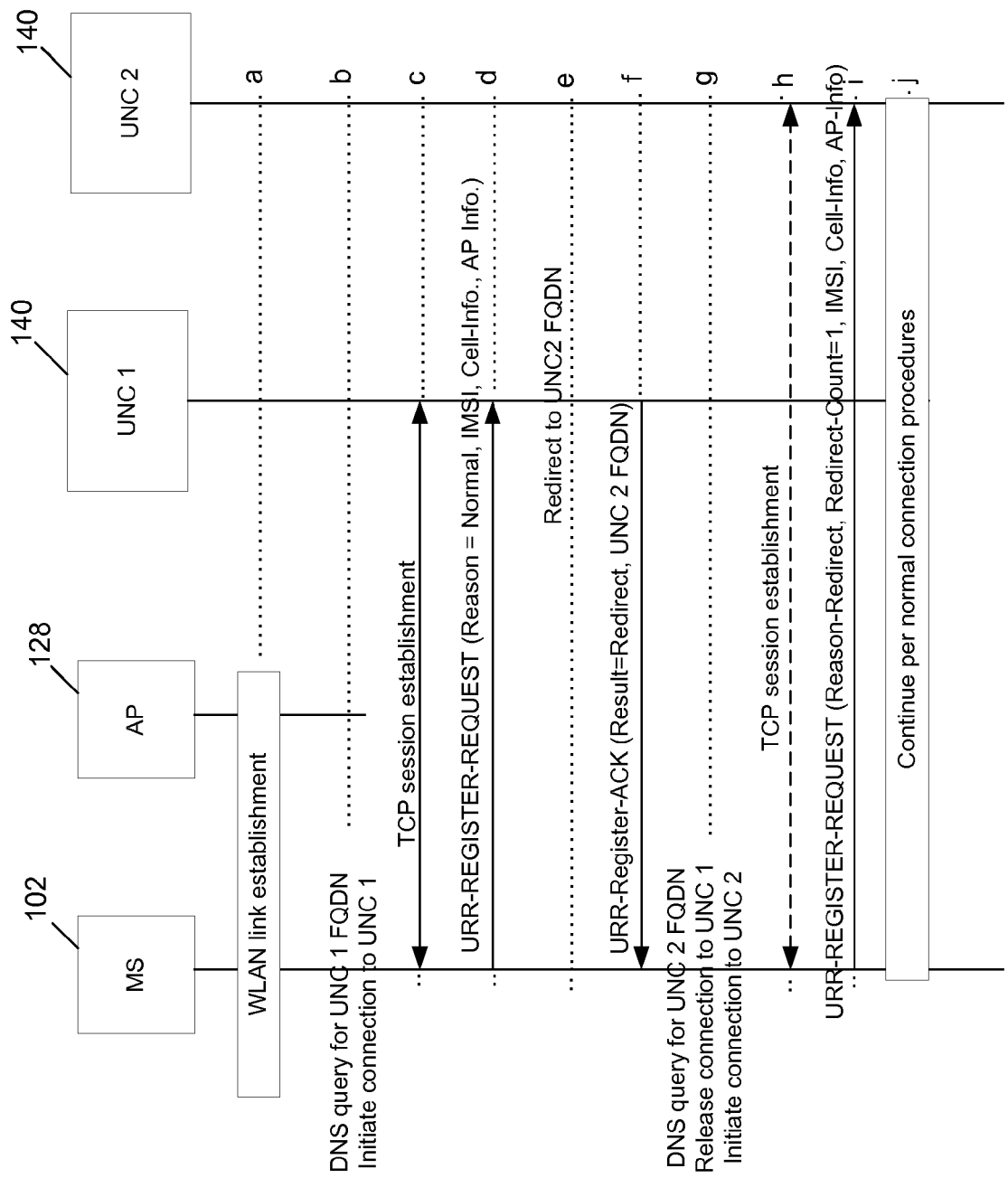
FIG. 6 is a message and data flow diagram illustrating messages and operations employed to redirect a mobile station to a different network controller during registration according to an embodiment.

FIG. 6 shows an example of a sequence of signals that may pass between a MS and AP on the one side and first and second UNCs on the other side. In the example of FIG. 6, aspects of the two communication systems shown in FIG. 7 are shown across the top of the diagram. Signals passing between the different aspects are shown as horizontal arrows with arrowheads connecting the aspects of the communication systems that are involved. When the arrow passes across an aspect and no arrowhead is shown, then this aspect acts as a pass through only. The arrows are identified by letters down the right hand side of the figure. The particular aspects of the system architecture of FIG. 1 that are involved in FIG. 6 are, from left to right, a mobile station (e.g. MS 102), an access point (e.g. WLAN AP 128), a first UNC (e.g. UNC 140) and a second UNC (e.g. UNC 140). The signals shown in FIG. 6 relate to signaling and do not indicate the flow of traffic or payload.

FIG. 6 shows an example of an MS that is registering with a UNC (UNC 140) and gets redirected to another UNC (UNC 2) during registration. The registration may take a variety of different forms including those described above. In particular, in the example of FIG. 6, the MS requests service from a first UNC and provides location information. It then gets redirected to a second UNC. The second UNC may be more appropriate for the MS's reported location.

At line A of FIG. 6, the MS comes into the coverage range of an AP and establishes a wireless link with the AP. This may be a WLAN connection using unlicensed frequencies. At line B, the MS looks for a UNC to establish a connection with. This may be done by performing a DNS (Domain Name System) query for a UNC. This initiates a connection to the first UNCs IP address. The MS may select the first UNC because it is the last UNC IP address that it used or it may be a default UNC or it may be a home UNC that the MS is assigned to for initial registrations, or it may be selected from a cache of connected UNCs indexed by AP and CGI. At line C, the UNC and the MS have established a TCP connection. Note that IPSec security procedures between the MS and UNC are not shown in the Figure.

At line D, the MS sends a registration message to the UNC. This registration message may take many different forms. In one embodiment, the registration message may be modeled on a UMA URR-REGISTER-REQUEST message. In addition to the normal registration content, such a message may includes a reason for the connection, identification numbers and addresses for the AP and information about transmitting base stations that are within range.

In a GSM system, this information is labeled Cell-Info and includes CGI and (optionally) C1 values. In one embodiment, only a single CGI is reported by the MS, representing the GSM cell that the MS has selected using its normal GSM cell selection procedures. This single cell has been selected by the MS to be the "best" GSM cell. Typically to develop such values the MS will scan certain designated frequencies to find broadcast channel (BCH) transmissions. The BCH will identify the transmitting base station and contain information about random access and traffic channels that are used by the particular base station. The MS can record the base station identities and measure the quality of the BCH signal as it is received. In GSM systems, the RXLEV (Received Signal Level) is typically measured but other quality measures may be used instead of, or in addition to the RXLEV, including signal to noise ratios, bit error rates, RSSI (Received Signal Strength Indicator) and signal propagation delays.

At line E, the UNC evaluates the received information about location and selects the appropriate UNC for the MS. This selection may be maintained for as long as the MS remains connected to the same AP. As mentioned above, there are a variety of different ways to select the appropriate UNC. In one embodiment, the UNC maps the base station information to a UNC that corresponds to the MSC for the best base stations. In another embodiment, the UNC maps the identification of the AP to a location, to a corresponding MSC and then to a corresponding UNC. In another embodiment, the UNC has no location information about base stations or the AP but it has a prior registration from the AP that included location information and selects a UNC on that basis.

At line F, the UNC acknowledges the registration request and sends an address for the selected UNC to the MS. The address may be in the form of a FQDN (Fully Qualified Domain Name) or in any other form. The acknowledgment of line F may be in a form similar to the UMA URR-REGISTER-REDIRECT, or in any of a variety of other forms.

At line G, the MS performs a DNS query for the selected UNC. It may also release the connection to the first UNC and initiate a connection to the second UNCs IP address. Accordingly, at line H, a TCP connection is established between the MS and the new UNC to which the MS was redirected. At line H, the connection is established between the MS and the second UNC. The IPSec tunnel with the original UNC may be reused or a new one may be established (not shown).

At line I, the MS may send a similar registration request message to the second UNC. This message may be similar to the message of line D. In a URR-REGISTER-REQUEST type of message, a reason field may carry a value for redirection instead of a normal connection. The information in the registration request may cause the new UNC to apply information that it has to further redirect the MS. Because it is closer to the location of the AP, it may have more or better information on the AP, nearby base stations or network resource allocations and may then further redirect the MS. The reason field may be used to inform the MS about the number of redirections. It may be used to limit the total number of redirections that a MS may experience at a single AP to one or two or any other number.

At line J, the connection with the UNC continues along its normal course. This may include registration acknowledgments, call setup and teardown, and any of a variety of different supported voice or data services, including security measures.

FIG. 7 shows the same aspects of FIG. 7 across the top and signaling on lines identified by letters in the same way as FIG. 6. FIG. 7, a MS registers but is not able to send any location information. Once it has location information it sends this to the UNC with which it is registered and is then redirected to a more appropriate UNC. The MS may update its location at any time using a process similar to the one shown in FIG. 7. The messages of FIG. 7 may follow those of FIG. 6, 8, or 9.

In line A, the MS has an established registration with the first UNC 140 and communicates through an AP 128. At line B, the MS obtains valid or updated location information. It may have been unable to receive base station BCH transmissions, or it may have not obtained accurate information on the AP, or both. The location information in line B may be new, updated, or more accurate location information.

At line C, the MS sends its location to the UNC. In one embodiment, this information is in the form of a URR-REGISTER-UPDATE-UPLINK message. The location information may be in any of the forms mentioned above, or in some other form.

At line D, the UNC applies the location information to determine an optimal UNC for the MS. This may be the same or a different UNC than the one at which the MS is already registered. Any one or more of the approaches mentioned above may be used to select a UNC. At line E, the MS is redirected, if appropriate and registers with the redirected UNC. This may be done with a URR-REGISTER-REDIRECT command. These transactions may take a form similar to lines g-j of FIG. 6.

Figure 8:
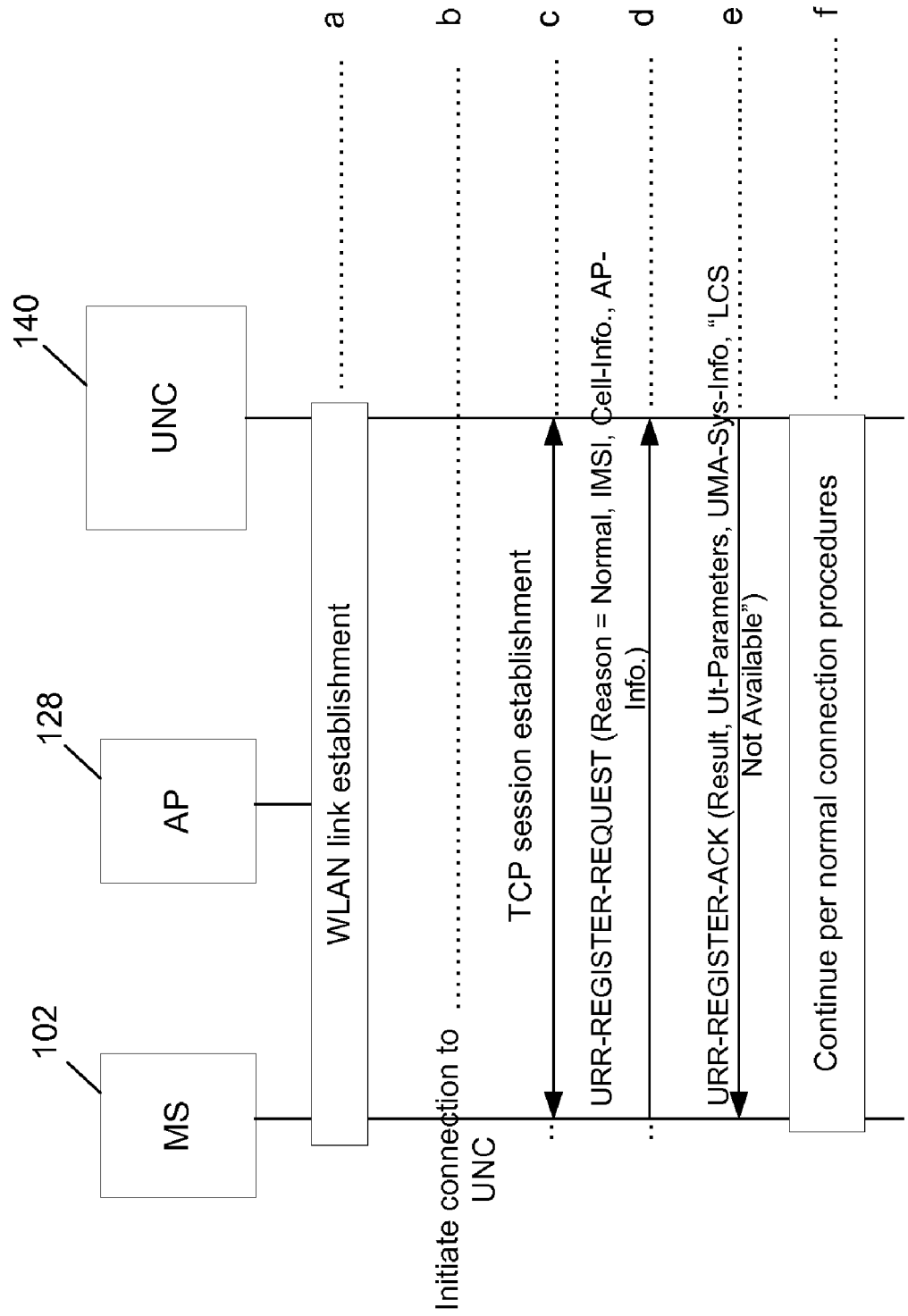
FIG. 8 is a message and data flow diagram illustrating messages and operations employed to provide location information during registration according to an embodiment.

FIG. 8 shows the same aspects of FIG. 7 across the top and signaling on lines identified by letters in the same way as FIG. 6. In FIG. 8, the MS is unable to provide any location information during registration. At line A, the MS 102 comes into the coverage range of the AP 128 and establishes a communication link over the unlicensed channel, such as a WLAN channel. At line B, the MS uses this connection through the AP to establish a connection to a UNC 140. As in FIGS. 6 and 7, this may be a default UNC, the last UNC that it registered with, a UNC provided by the AP, or a UNC selected in any other manner. At line C the MS and the UNC establish a TCP connection.

As in FIG. 6, after the TCP connection is established, then at line D, the MS sends its registration message which includes location information. However, in the example of FIG. 8, the MS is unable to receive any base station transmissions, so the cell-info field is blank. The MS may be able to send information about the AP, for example an identification number, a MAC (Media Access Control) address or a BD (Bluetooth Device) address. The UNC may use the cell-info field to determine the location of the MS to the resolution of a GSM cell. However, if this information is not available, the UNC may look up the AP in a mapping or lookup table or database to determine the MS location to the resolution of an AP. If the location of the AP is known with precision, then the range of the AP will be more precise than the range of a GSM cell. Typically an AP will have a range of 10's or 100's of meters, while a GSM cell will have a range of kilometers. However, the range of the various radio transmitters and receivers will depend on the particular implementation.

If the MS does not provide information about neighboring base stations (cell-info is empty) and there is no location information available for the AP, then the UNC may not be able to reliably determine the location of the MS. This may affect the UNC's ability to select a base station and it may also affect services that rely on location information, including emergency (E911) services. At line E, the UNC indicates this to the MS by returning a registration acknowledgment (URR-REGISTER-ACK) which indicates that location services (LCS) are not available.

Figure 9:
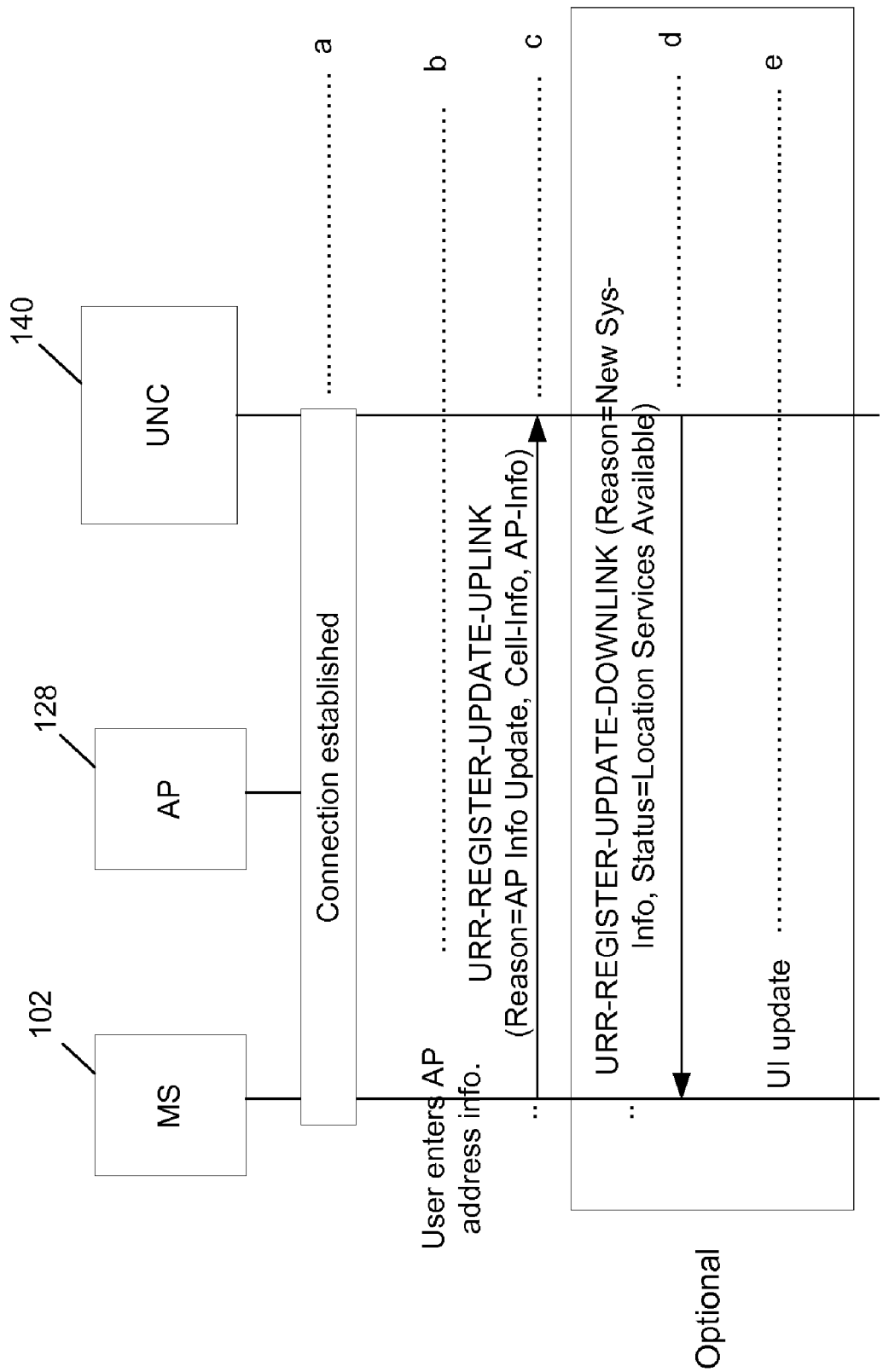
FIG. 9 is a message and data flow diagram illustrating messages and operations employed to update location information after registration.

FIG. 9 shows the same aspects of FIG. 7 across the top and signaling on lines identified by letters in the same way as FIG. 6. In FIG. 9, the MS updates location information after a registration without location information. The messages of FIG. 9, may follow those of FIG. 6, 7, or 8.

At line A, the MS 102 is coupled to a UNC 140, through an AP 128 with a normal connection established. At line B, the MS user sees that location services are not available and enters location information for the AP to which the MS is connected. This may be a street address, a postal or ZIP code, latitude and longitude, or any other information. The MS takes this information at line C and formats it into a registration update message (URR-REGISTER-UPDATE-UPLINK). The UNC receives this information and updates its record for the MS.

At line D, if the UNC determined a sufficiently accurate location from the registration update message, then the UNC sends a message (URR-REGISTER-UPDATE-DOWNLINK) to indicate that location services are now available. Accordingly, at line E, the MS can signal the user through the user interface, for example a screen display, that location services are available.

The messages of FIGS. 7 and 9 may also be used when a user moves from one AP to another AP. These messages may be used to report the location information of the new AP. The messages may also be used to report newly acquired base station information. A base station's broadcast channel may have been blocked by a physical obstacle or multi-path interference. The MS may occasionally rescan for BCH transmissions and, if it receives different information, send a registration update. The UNC can use this information to update the status of location services, to evaluate whether the MS should be redirected to a different UNC and for other processes. The UNC may also use the identity and location information of a new AP to determine whether to deny service. Certain locations or APs may be outside of the network or subscription plan, so that service from such an AP should be denied.

The particular equipment, services, sequences of events and types of signals are provided as examples only. While the example of FIGS. 6, 7, 8, and 9 are presented in the context of a VoIP WLAN AP and a GSM cellular network. Appropriate modifications may be made to comply with other types of networks and protocols. In addition to a wireless mobile station and a wireless access point, embodiments of the invention may be applied to other types of subscriber equipment including enterprise systems and networks, private and public switched networks and other wired, wireless and hybrid systems that may connect to a UNC or similar device through the Internet or through any other communications medium.

In addition to a UNC, embodiments of the invention may be applied to other network devices that interface to a PLMN or PSTN. In addition to a GSM architecture, embodiments of the invention may be applied to other types of telecommunications networks, both wired and wireless, these may include those based on CDMA, TDMA, PCS (Personal Communication Services), PHS (Personal Handyphone System) and other standardized protocols. The protocol architecture diagrams described above are provided as examples only. Many of the layers may be grouped, divided or identified differently to suit a particular application. The components involved in communicating at any particular layer may also be modified to suit a particular application.

Figure 10:
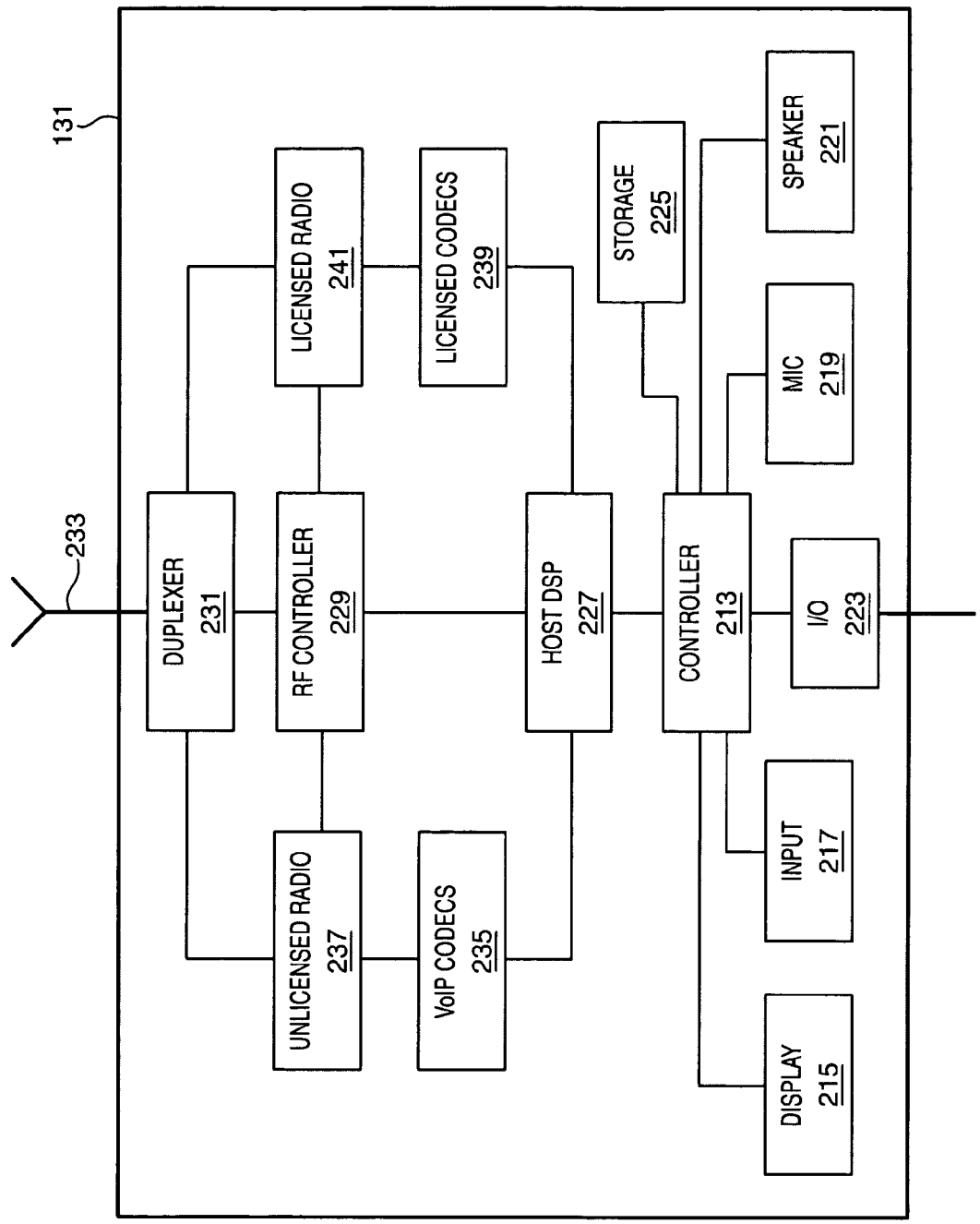

FIG. 10 shows an example of a MS 131 that may be used according to some embodiments of the present invention. The MS of FIG. 10 may be in a form that resembles a dual mode cellular telephone, a cordless telephone, a PDA, a portable computer or a communications card in a larger computer. The functions of the MS are managed by a controller 213 that is coupled to a display 215, a user input device 217, a microphone 219 and a speaker 221. While these components are shown as incorporated into the MS, as may be done for example in a dual mode portable telephone, one or more of the components may be external. The microphone and speaker may be in an external wired or wireless headset or handset, the input device may be an external pointing device or keyboard, and the display may be a standalone monitor. External components may be wired to the device or wirelessly attached, as with a WLAN or Bluetooth radio connection. Any one or more of the illustrated user interface components may be removed for particular applications.

The controller may also be coupled to one or more other I/O (Input/Output) devices 223. These may be a synchronization port, an accessory port, a wired network interface, a docking port, a port replicator that permits further external devices to be attached or an interface to a base station. If the MS is adapted for use as a component of a larger computer system, then the display, input, microphone or speaker may be removed in favor of a bus interface 223. The bus interface may be a PC cardbus, PCI (Peripheral Component Interconnect) bus, a USB (Universal Serial Bus), IDE (Integrated Device Electronics), ATA (Advanced Technology Attachment) or other type of bus. The bus interface may be combined with a display 215, such as status LEDs (Light Emitting Diodes) and a speaker 221.

The controller 213 is further coupled to one or more storage devices 225 such as RAM (Random Access Memory), ROM (Read Only Memory), flash memory, a disk drive and an optical drive. The storage may be used to store operating instructions, applications, and data that is communicated with the enterprise and public domains. The controller is also coupled to a host DSP (Digital Signal Processor). The host DSP communicates data with the controller that is to be carried by the radios. The data may represent voice, text, graphics, applications, etc. The host DSP 227 controls the flow of the data to and from the radio and controls the radios themselves through an RF controller 229. The RF controller controls timing, frequencies, and other aspects of the radios.

The MS of FIG. 10 shows two radio paths from a single antenna 233. More radio paths may be used and, if the radio systems are sufficiently similar, then different radio interfaces may be carried by a single path. The antenna is coupled to a duplexer 231 controlled by the RF controller that routes signals from the appropriate system to the appropriate radio. The duplexer may be a passive frequency multiplexer and demultiplexer or it may be an active device. The duplexer is coupled to an enterprise radio 237 capable of communicating in the enterprise domain 111 and to a licensed band radio 241 capable of communicating in the public domain 113.

The radios 237, 241, controlled by the RF controller, may contain amplifiers, frequency converters, multiplexers, demultiplexers, equalizers, analog and digital converters, encoders and decoders, splitters and combiners, spreaders, despreaders and other elements. The radios are each coupled to voice and data codecs 235, 239 which are, in turn, coupled to the host DSP. Data or voice received from the antenna propagates through the duplexer to the appropriate radio, through the codec, to the host DSP and then to the controller for display, output, play or storage. Data or voice to be transmitted follows the opposite path from the controller through the DSP to the appropriate codecs and radio, through the duplexer and the antenna. The particular type of radio and transmission and reception chain may be adapted to suit different applications. More or less components than those shown in FIG. 10 may be used in a MS. The transmit and receive chains may be combined, as shown or separated.

Figure 11:
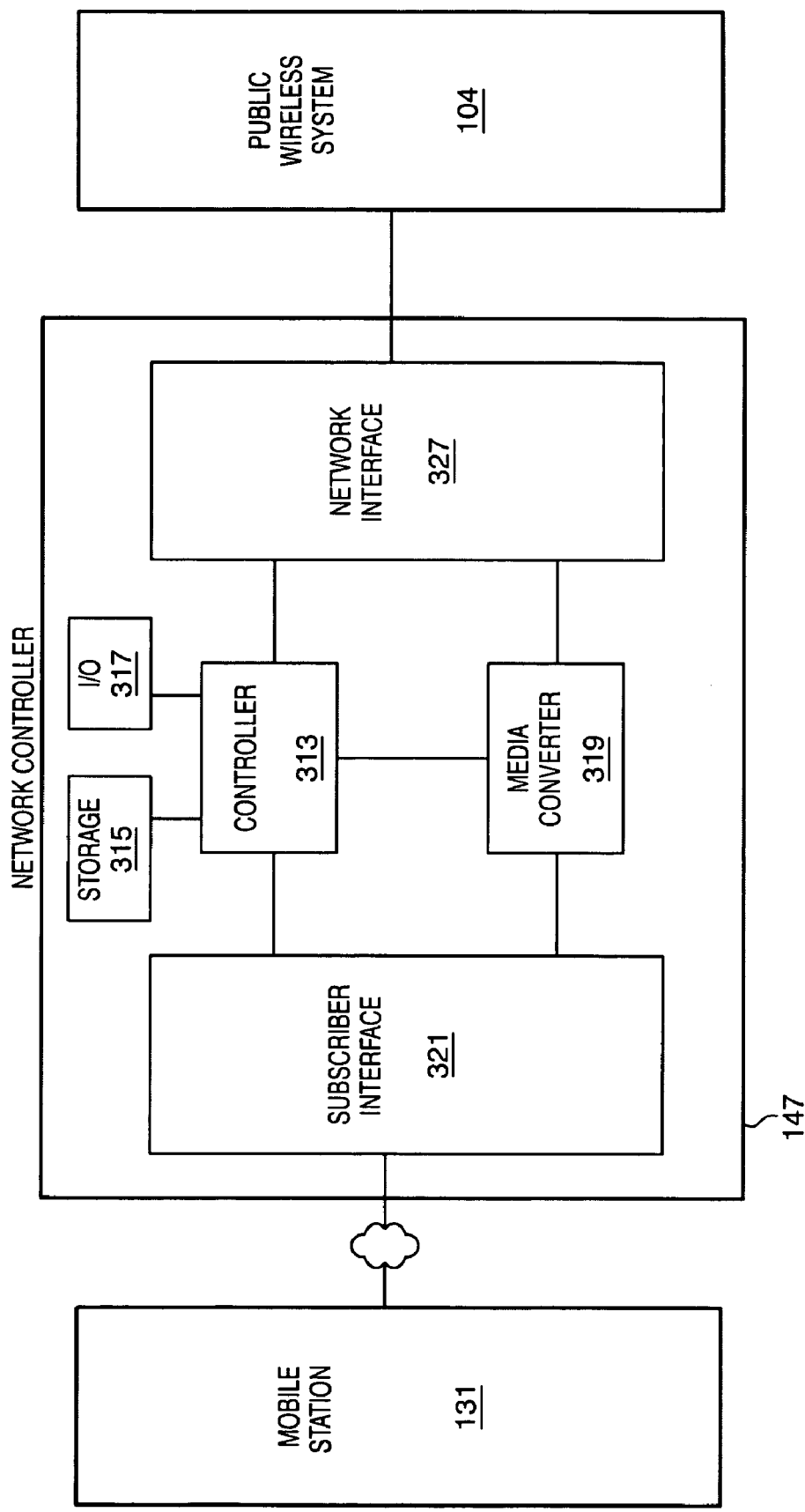
FIG. 11 is a block diagram of a communications network controller according to and embodiment.

FIG. 11 shows an example of an network controller 147 that may be used for date communications according to an embodiment of the invention to seamlessly interconnect a mobile station 131 with a telephony network 104. The network controller has a controller 313 that is coupled to one or more storage devices 315 such as RAM, ROM, flash memory, and disk drives, and to one or more I/O devices 317, such as user interface devices or remote administration and management interfaces. The storage may contain operating and application instructions for the controller as well as data to be communicated by the device.

A subscriber interface 321 is coupled to one or more access points or subscriber switches through a dedicated private line, a LAN, a WAN (Wide Area Network), the Internet or through any of a variety of other means. The subscriber interface handles signaling and traffic with one or more mobile and fixed subscribers. Similarly, a network interface 327 is coupled to one or more public communications systems 104 for signaling and traffic.

A media converter 319 may be included to convert traffic between the two systems. Alternatively, these conversions, if any, may be performed in the respective interface. Signaling may also be converted by the controller, the interfaces, or a signaling converter (not shown).

It is to be appreciated that a lesser or more equipped UNC, AP, mobile station, private network, and public network than the examples described above may be desirable for certain implementations. Additional or different components, interfaces, buses and capabilities may be used and additional devices may be added to any of these components. Some of the illustrated components may also be removed from the devices. The configuration of the UNC, AP, mobile station, private network, and public network may vary with different implementations depending upon numerous factors, such as price constraints, performance requirements, technological improvements, or other circumstances. It is not necessary that the licensed frequencies be used for a portion of the system nor that unlicensed frequencies be used for a portion of the system. It is further not necessary that a portion of the system be private and another portion be public.

Although the description of the various embodiments refers primarily to using location information in establishing a VoIP private network call through a GSM cellular telecommunications system, the various embodiments may also be used with other types of private communications systems and with other types of public telecommunications networks. The various embodiments may be applied to voice networks, data networks and combined networks whether they are circuit switched or packet switched.

It will be understood that an embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

APPENDIX I

Table Of Acronyms

| | |
|---|---|
| AP | Access Point |
| ARFCN | Absolute RF Channel Number |
| ATM | Asynchronous Transfer Mode |
| ATM | VCATM Virtual Circuit |
| BA | BCCH Allocation |
| BAS | Broadband Access System |
| BB | Broadband |

APPENDIX I-continued

Table Of Acronyms

| | |
|---|---|
| BCCH | Broadcast Common Control Channel |
| BRAS | Broadband Remote Access System |
| BSC | Base Station Controller |
| BSS | Base Station Subsystem |
| BSSGP | Base Station System GPRS Protocol |
| BSSMAP | Base Station System Management Application Part |
| BTS | Base Transceiver Station |
| CDMA | Code Division Multiple Access |
| CGI | Cell Global Identification |
| CIC | Circuit Identity Code |
| CLIP | Calling Line Presentation |
| CM | Connection Management |
| CPE | Customer Premises Equipment |
| CS | Circuit Switched |
| CVSD | Continuos Variable Slope Delta modulation |
| DSL | Digital Subscriber Line |
| DSLAM | DSL Access Multiplexer |
| DTAP | Direct Transfer Application Part |
| ETSI | European Telecommunications Standards Institute |
| FCAPS | Fault-management, Configuration, Accounting, Performance, and Security |
| FCC | US Federal Communications Commission |
| GERAN | GSM Edge Radio Access Network |
| GGSN | Gateway GPRS Support Node |
| GMM/SM | GPRS Mobility Management and Session Management |
| GMSC | Gateway MSC |
| GSM | Global System for Mobile Communication |
| GPRS | General Packet Radio Service |
| GSN | GPRS Support Node |
| GTP | GPRS Tunnelling Protocol |
| HLR | Home Location Register |
| IAN | Indoor Access Network (see also UMA Cell) |
| IAN-RR | Indoor Access Network Radio Resource Management |
| IBS | Indoor Base Station. |
| IBSAP | IBS Application Protocol |
| IBSMAP | IBS Management Application Protocol |
| IEP | IAN Encapsulation Protocol |
| IETF | Internet Engineering Task Force |
| IMEI | International Mobile Station Equipment Identity |
| IMSI | International Mobile Subscriber Identity |
| INC | Indoor Network Controller |
| INC | Indoor Network Controller |
| IP | Internet Protocol |
| ISDN | Integrated Services Digital Network |
| ISP | Internet Service Provider |
| ISP IP | Internet Service Provider's IP |
| IST | IAN Secure Tunnel |
| ISUP | ISDN User Part |
| ITP | IAN Transfer Protocol |
| LA | Location Area |
| LAI | Location Area Identification |
| LLC | Logical Link Control |
| MAC | Medium Access Control |
| MAP | Mobile Application Part |
| MDN | Mobile Directory Number |
| MG | Media Gateway |
| MM | Mobility Management |
| MM | Mobility Management |
| MS | Mobile Station |
| MSC | Mobile Switching Center |
| MSC | Mobile Switching Center |
| MSISDN | Mobile Station International ISDN Number |
| MSRN | Mobile Station Roaming Number |
| MTP1 | Message Transfer Part Layer 1 |
| MTP2 | Message Transfer Part Layer 2 |
| MTP3 | Message Transfer Part Layer 3 |
| NAPT | Network Address and Port Translation |
| NAT | Network Address Translation |
| NS | Network Service |
| PCM | Pulse Code Modulation |
| PCS | Personal Communication Services |
| PCS | Personal Communications Services |
| PLMN | Public Land Mobile Network |
| POTS | Plain Old Telephone Service |
| PPP | Point-to-Point Protocol |
| PPPoE | PPP over Ethernet protocol |

APPENDIX I-continued

Table Of Acronyms

| | |
|---|---|
| PSTN | Public Switched Telephone Network |
| P-TMSI | Packet Temporary Mobile Subscriber Identity |
| QoS | Quality of Service |
| RA | Routing Area |
| RAC | Routing Area Code |
| RAI | Routing Area Identification |
| RAI | Routing Area Identity |
| RAN | Radio Access Network |
| RF | Radio Frequency |
| RFC | Request for Comment (IETF Standard) |
| RLC | Radio Link Control |
| RR | Radio Resource Management |
| RTCP | Real Time Control Protocol |
| RTCP | Real Time Control Protocol |
| RTP | Real Time Protocol |
| RTP | Real Time Protocol |
| SAP | Service Access Point |
| SCCP | Signaling Connection Control Part |
| SCO | Synchronous Connection-Oriented |
| SDCCH | Standalone Dedicated Control Channel |
| SGSN | Serving GPRS Support Node |
| SMC | Short Message Service Centre |
| SMS | Short Message Service |
| SM-SC | Short Message Service Centre |
| SMS-GMSC | Short Message Service Gateway MSC |
| SMS-IWMSC | Short Message Service Interworking MSC |
| SNDCP | SubNetwork Dependent Convergence Protocol |
| SS | Supplementary Service |
| SSL | Secure Sockets Layer |
| TCAP | Transaction Capabilities Application Part |
| TCP | Transmission Control Protocol |
| TCP | Transmission Control Protocol |
| TLLI | Temporary Logical Link Identity |
| TMSI | Temporary Mobile Subscriber Identity |
| TRAU | Transcoder and Rate Adaptation Unit |
| TTY | Text telephone or teletypewriter |
| UDP | User Datagram Protocol |
| UMA Cell | Unlicensed Mobile Access Cell (see also IAN) |
| UMTS | Universal Mobile Telecommunication System |
| UNC | UMA Network Controller (see also INC) |
| VLR | Visited Location Register |
| VMSC | Visited MSC |
| WLAN | Wireless Local Area Network |
| WSP IP | Wireless Service Provider's IP Network |

What is claimed is:

1. A method performed by a first network controller of an unlicensed wireless first communication system, the method comprising:

establishing a data communications connection with a mobile station at the first network controller, the first network controller communicatively coupling a plurality of service regions of the unlicensed wireless first communication system to a licensed wireless second communication system;

receiving location information from the mobile station as part of a registration procedure for enabling the mobile station access to communication services of the unlicensed wireless first communication system, the location information comprising a cell identity identifying a service area of the licensed wireless second communication system;

identifying a second network controller of the unlicensed wireless first communication system having a service area overlapping the service area of the licensed wireless second communication system identified by said cell identity; and prior to enabling the mobile station access to the communication services of the unlicensed wireless first communication system, redirecting the mobile station to the second network controller to cause the mobile station to complete the registration procedure through the second network controller.

2. The method of claim 1, wherein receiving location information from the mobile station comprises receiving a registration request, the registration request comprising the location information.

3. The method of claim 1 further comprising passing data over the established data communications connection, wherein receiving location information comprises receiving location information from the mobile station after passing the data.

4. The method of claim 1, wherein the cell identity comprises a cell global identification (CGI).

5. The method of claim 4, wherein the CGI comprises a location area identity (LAI).

6. The method of claim 1 further comprising:
evaluating the received location information to determine whether the received location information is sufficient to support location services; and
indicating to the mobile station whether the location services are available.

7. The method of claim 1, wherein the location information further comprises an access point ID (AP-ID) for identifying an access point of the unlicensed wireless first communication system through which the mobile station is accessing the unlicensed wireless first communication system.

8. The method of claim 1, wherein the second network controller is communicatively coupled to a same mobile switching center (MSC) as a base station controller (BSC) of the licensed wireless second communication system to which the service area of the licensed wireless second communication system belongs.

9. The method of claim 1, wherein the mobile station is in a service area of a base station controller (BSC) of the licensed wireless second communication system, wherein the second network controller is communicatively coupled to a first mobile switching center (MSC) that does not service said BSC, the method further comprising handing over the second network controller to a second MSC that services said BSC.

10. A first network controller of an unlicensed wireless first communication system, the first network controller communicatively coupling a plurality of service regions of the unlicensed wireless first communication system to a licensed wireless second communication system, the first network controller comprising:
an interface to communicate with a mobile station over an established data communications connection and to receive location information from the mobile station for enabling the mobile station access to communication services of the unlicensed wireless first communication system, the location information comprising a cell identity identifying a service area of the licensed wireless second communication system; and
a module to select a second network controller of the unlicensed wireless first communication system having a service area overlapping the service area of the licensed wireless second communication system identified by said cell identity, and prior to enabling the mobile station access to the communication services of the unlicensed wireless first communication system, to formulate a redirection message to redirect the mobile station to the selected second network controller for access to said communication services through the second network controller.

11. The first network controller of claim 10, wherein the interface receives a registration request, the registration request comprising the location information.

12. The first network controller of claim 10, wherein the cell identity comprises a cell global identification (CGI).

13. The first network controller of claim 12, wherein the CGI comprises a location area identity (LAI).

14. The first network controller of claim 10, wherein the second network controller is communicatively coupled to a same mobile switching center (MSC) as a base station controller (BSC) of the licensed wireless second communication system to which the service area of the licensed wireless second communication system belongs.

15. A mobile station comprising:
a transmitter to send location information to a first network controller of an unlicensed wireless first communication system as part of a registration procedure for enabling the mobile station access to communication services of the unlicensed wireless first communication system using an established data communications connection with the first network controller, the first network controller communicatively coupling a plurality of service regions of the unlicensed wireless first communication system to a licensed wireless second communication system, the location information comprising a cell identity identifying a service area of the licensed wireless second communication system; and
a receiver to receive a redirection message from the first network controller to redirect the mobile station to complete said registration procedure with a second network controller of the unlicensed wireless first communication system having a service area overlapping the service area of the licensed wireless second communication system identified by said cell identity in order to access said communication services in response to sending the location information.

16. The mobile station of claim 15, wherein the established data communications connection is used for sending a registration request comprising said location information.

17. The mobile station of claim 15, wherein the established data communications connection is through a wireless access point, wherein the location information comprises an identification of the wireless access point.

18. The mobile station of claim 15, further comprising an interface to communicate with said licensed wireless second communication system, the interface for receiving the cell identity identifying the service area of the licensed wireless second communication system.

19. The mobile station of claim 15, wherein the second network controller is communicatively coupled to a same mobile switching center (MSC) as a base station controller (BSC) of the licensed wireless second communication system to which the service area of the licensed wireless second communication system belongs.

20. The mobile station of claim 15, wherein the cell identity comprises a cell global identification (CGI), wherein the CGI comprises a location area identity (LAI).

* * * * *